US011212083B2

(12) United States Patent
Yang et al.

(10) Patent No.: US 11,212,083 B2
(45) Date of Patent: Dec. 28, 2021

(54) SLAVE SECURE SOCKETS LAYER PROXY SYSTEM

(71) Applicant: A10 NETWORKS, INC., San Jose, CA (US)

(72) Inventors: Yang Yang, San Jose, CA (US); Paul Jiang, San Jose, CA (US); Wei Sun, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 216 days.

(21) Appl. No.: 16/124,785

(22) Filed: Sep. 7, 2018

(65) Prior Publication Data

US 2020/0084029 A1    Mar. 12, 2020

(51) Int. Cl.
*H04W 12/04* (2021.01)
*H04L 9/08* (2006.01)
*H04L 29/06* (2006.01)

(52) U.S. Cl.
CPC .......... *H04L 9/0827* (2013.01); *H04L 9/0822* (2013.01); *H04L 63/166* (2013.01); *H04L 63/168* (2013.01); *H04W 12/04* (2013.01)

(58) Field of Classification Search
CPC ... H04L 9/0827; H04L 63/166; H04L 9/0822; H04L 63/168; H04W 12/04
See application file for complete search history.

(56) References Cited

U.S. PATENT DOCUMENTS

| 10,055,591 B1* | 8/2018 | Sharifi Mehr | G06F 21/31 |
| 10,516,649 B1* | 12/2019 | Jain | H04L 67/10 |
| 2013/0013931 A1* | 1/2013 | O'Hare | H04L 9/085 713/189 |
| 2019/0058735 A1* | 2/2019 | Salmela | H04W 12/06 |
| 2019/0081983 A1* | 3/2019 | Teal | H04L 63/0227 |

\* cited by examiner

*Primary Examiner* — Lynn D Feild
*Assistant Examiner* — Vladimir I Gavrilenko
(74) *Attorney, Agent, or Firm* — Keith Kline; The Kline Law Firm PC

(57) ABSTRACT

Provided are methods and systems for establishing secure sessions. A method for establishing secure sessions may commence with receiving a request to establish a secure session between a client and a server. Client security parameters may be provided in client extension fields of the request. The method may include forwarding the request to the server and receiving a secure session response from the server. Server security parameters may be provided in server extension fields of the secure session response. The method may include receiving a server key secret, forwarding the secure session response and the server key secret to the client, receiving a client key secret, and forwarding the client key secret to the server. The method may continue with calculating a session key and establishing a first secure session between the security gateway and the server and a second secure session between the security gateway and the client.

20 Claims, 14 Drawing Sheets

SLAVE SECURE SOCKETS LAYER PROXY SYSTEM

TECHNICAL FIELD

This disclosure relates generally to data processing and, more particularly, to establishing secure sessions.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Web application and service providers become more aware of data and network security. It is common for public websites, network applications, mobile applications, enterprise applications, industrial applications, and many applications using private and public networks to use secure communication sessions. During the secure communication sessions, data packets are encrypted and can only be decrypted by the web service servers. Existing deep-inspection-based network security appliances cannot examine encrypted data and cannot root out any attacks to the servers. Attackers are also aware of the secure communication sessions and may shift their attacks to server applications and servers. Therefore, the attacking data may be encrypted within the secure sessions and may not be detected by the network security appliances.

A Secure Sockets Layer (SSL) is a cryptographic protocol designed for providing communication security over the Internet. The SSL becomes a de facto standard secure Internet session for web browsing, mobile applications, and cloud computing. However, potential vulnerabilities hidden behind the SSL, such as a HyperText Transfer Protocol (HTTP) flood attack, cannot be detected until attacking SSL sessions reach an HTTP server, which is usually too late to stop the HTTP flood attack.

Conventional SSL interception-based solutions require using a private server certificate by servers. However, the solutions with private server certificates are often not accepted by businesses, applications, or users that do not want to have their own private server certificates.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure relates to approaches for establishing secure sessions. Specifically, a system for establishing secure sessions may include a security gateway and a storage unit in communication with the security gateway. The security gateway may be configured to receive, from a client, a request to establish a secure session between the client and a server. The request may include a data packet having one or more client extension fields. The data packet may include client security parameters in the one or more client extension fields. The security gateway may be configured to forward the request to the server and receive, from the server, a secure session response. The secure session response may include a further data packet having one or more server extension fields. The further data packet may include server security parameters in the one or more server extension fields. The security gateway may be configured to receive, from the server, a server key secret and forward the secure session response and the server key secret to the client. Upon forwarding the secure session response and the server key secret to the client, the security gateway may receive a client key secret from the client and forward the client key secret to the server. The security gateway may be configured to calculate a session key based on the client key secret and one of the client security parameters and the server security parameters. The security gateway may be further configured to establish a first secure session between the security gateway and the server. The security gateway may be configured to establish a second secure session between the security gateway and the client. Both the first secure session and the second secure session may be associated with the session key. The storage unit may be configured to store at least the session key, the client security parameters, and the server security parameters.

According to another approach of the present disclosure, there is provided a method for establishing secure sessions. The method may commence with receiving, from a client, a request to establish a secure session between the client and a server. The request may include a data packet having one or more client extension fields. The data packet may include client security parameters in the one or more client extension fields. The method may further include forwarding the request to the server and receiving a secure session response from the server. The secure session response may include a further data packet having one or more server extension fields. The further data packet may include server security parameters in the one or more server extension fields. The method may continue with receiving, from the server, a server key secret and forwarding the secure session response and the server key secret to the client. The method may further include receiving a client key secret from the client and forwarding the client key secret to the server. The method may continue with calculating a session key based on the client key secret and one of the client security parameters and the server security parameters. The method may further include establishing a first secure session between the security gateway and the server and establishing a second secure session between the security gateway and the client. The first secure session and the second secure session may be associated with the session key.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
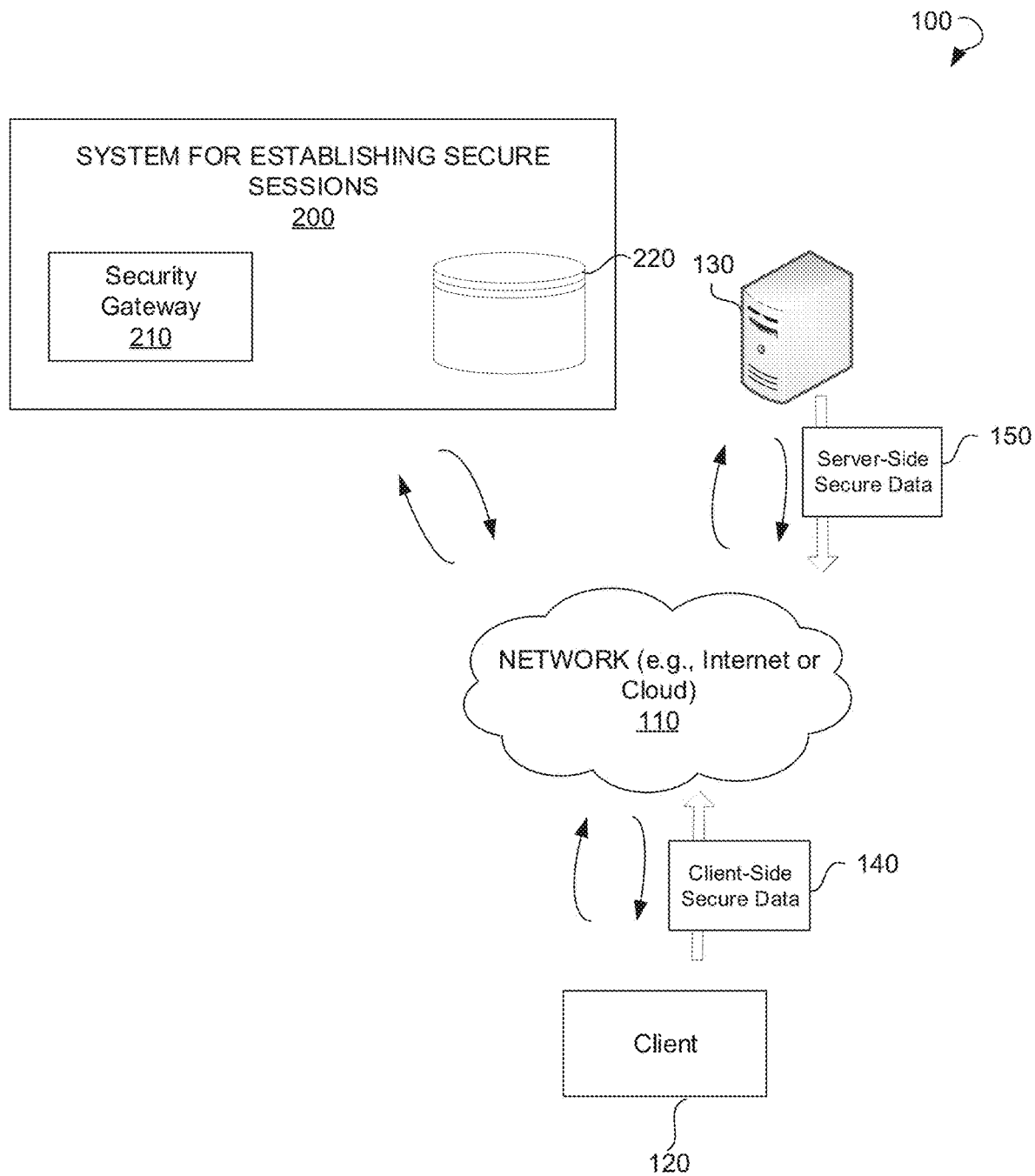
FIG. 1 shows an environment, within which methods and systems for establishing secure sessions can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, router, network appliance, and so forth.

As outlined in the summary, the embodiments of the present disclosure are directed to establishing secure sessions. A system for establishing secure sessions can be responsible for establishing a secure session between a client and a server by a security gateway while the security gateway serves as a proxy between the client and the server. Specifically, a communication session, such as a TCP session, may be established between the client and the server. The communication session between the client and the server may be established as a first communication session between the client and the security gateway and a second communication session between the server and the security gateway. When the client wants to establish a secure session with the server, the client may send, over the communication session, a request to establish the secure session with the server.

Typically, the secure session, e.g., an SSL session, between the client and the server commences with a handshake procedure that includes a process of negotiation to dynamically set parameters of a communication channel between the client and the server. In a conventional three-way handshake procedure to establish the secure session between the client and the server, the client sends a Client Hello message to the server and the server responds with a Server Hello message and sends a private server certificate. However, many businesses and enterprises may not want to configure their servers with private server certificates. To avoid the need for the private server certificates, the system of the present disclosure may alter the handshake procedure between the client and server. Specifically, the client may send a Client Hello message and add client key parameters into extension fields of the Client Hello message. The security gateway may intercept the Client Hello message, retrieve the client key parameters, and forward the Client Hello message to the server. The server may receive the Client Hello message, retrieve the client key parameters from the extension fields, and respond with a Server Hello message. The Server Hello message of the server may include server key parameters in extension fields of the Server Hello message. The server may also send a server key secret to the client. The security gateway may intercept the Server Hello message, retrieve the server key parameters, and forward the Server Hello message and the server key secret to the client. The client may receive the Server Hello message and the server key secret and retrieve the server key parameters from the Server Hello message. Upon receipt of the server key secret, the client may encrypt a client key secret using the server key secret and send the encrypted client key secret to the server. The security gateway may intercept the encrypted client key secret sent by the client, decrypt the encrypted client key secret using the server key secret previously received by the security gateway from the server, and forward the encrypted client key secret to the server.

The security gateway may establish a first secure session between the security gateway and the server and calculate a session key for the first secure session. Specifically, the security gateway may calculate the session key based on the client security parameters and the client key secret. The session key may be used by the security gateway and the server for encrypting and decrypting data packets associated with the first secure session. The server may calculate the same session key for the first secure session based on the client security parameters and the client key secret.

The security gateway may further establish a second secure session between the security gateway and the client and calculate the session key for the second secure session. Specifically, the security gateway may calculate the session key based on the server security parameters and the client key secret. The session key may be used by the security gateway and the client for encrypting and decrypting data packets associated with the second secure session. The session key for the second secure session may be the same as the session key used for the first secure session. The client may calculate the session key for the second secure session based on the server security parameters and the client key secret.

Therefore, the secure session may be established between the client and the server as a combination of the first secure session between the security gateway and the server and the second secure session between the security gateway and the client. The server may not need to provide the private server certificate, but may provide server key parameters in the extension fields of the Server Hello message. The server key parameters may be used by the client for calculating the session key. Similarly, the client may not need to request the server certificate from the server, but may provide client key parameters in the extension fields of the Client Hello message. The server may use the client key parameters for calculating the session key. The security gateway located between the client and the server may calculate the same session key both for the first secure session between the security gateway and the server and the second secure session between the security gateway and the client.

Thus, the system for establishing secure sessions may act as a slave SSL proxy system that may bridge a SSL session between the client and the server without the need of using server private certificates.

Referring now to the drawings, FIG. 1 illustrates an environment 100 within which methods and systems for establishing secure sessions can be implemented. The environment 100 may include a data network shown as a network 110, such as the Internet or a cloud, a client 120, a server 130, and a system 200 for establishing secure sessions. The client 120 may include a network machine or a network resource that sends client-side secure data 140 to the server 130. The server 130, in turn, may send server-side secure data 150 to the client 120. The client 120 and the server 130 may communicate with each other using the network 110.

The network 110 may include the Internet, the cloud, or any other network capable of communicating data between devices. Suitable networks may include or interface with any one or more of, for instance, a local intranet, a Personal Area Network, a Local Area Network, a Wide Area Network, a corporate data network, a data center network, a home data network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 110 may include a network of data processing nodes that are interconnected for the purpose of data communication.

The system 200 may intercept both the client-side secure data 140 and the server-side secure data 150 and establish secure sessions between the client 120 and the server 130, as well as may perform encryption and decryption steps and inspect the decrypted traffic for security threats as described in further detail below.

Figure 2:
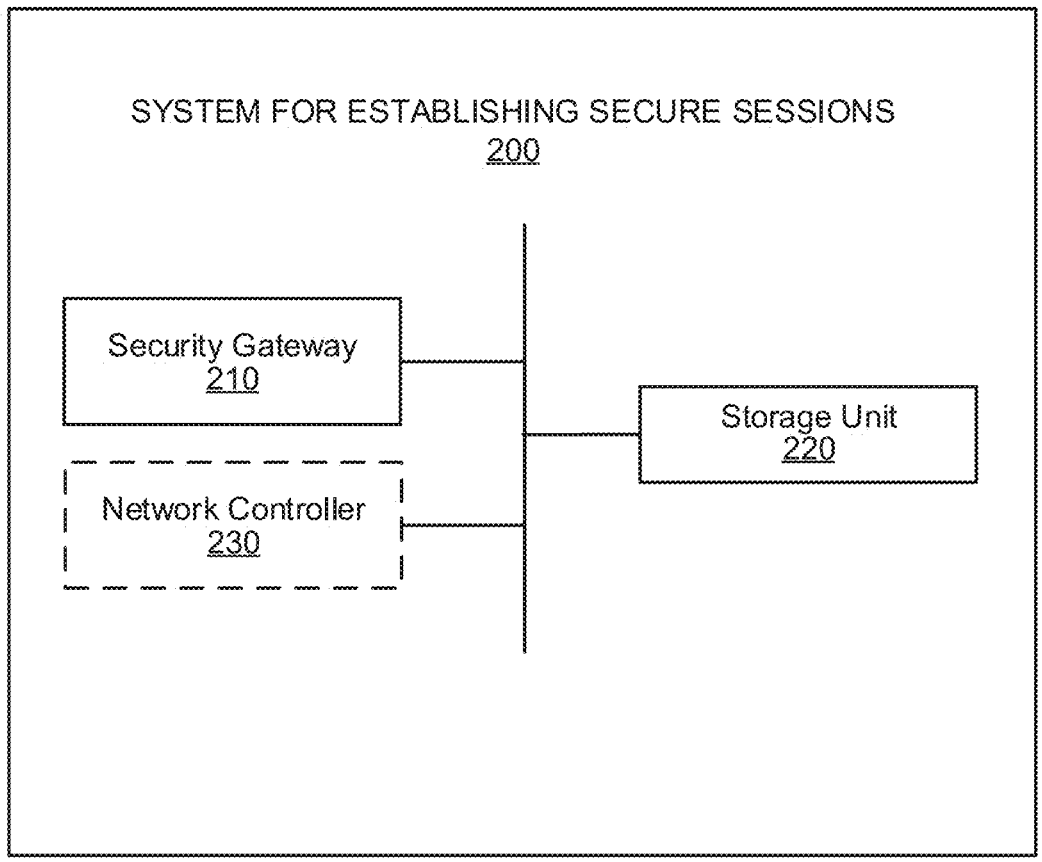
FIG. 2 is a block diagram illustrating various modules of a system for establishing secure sessions, according to an example embodiment.

FIG. 2 shows a block diagram illustrating various modules of an example system 200 for establishing secure sessions. Specifically, the system 200 may include a security gateway 210, a storage unit 220, and optionally a network controller 230. The security gateway 210 may be located in a network between a client and a server and may serve data communications between the client and the server.

The security gateway 210 may be configured to receive a request for a communication session between the client and the server. The request for a communication session may be received from the client. Based on the request for the communication session, the security gateway 210 may establish a first communication session between the security gateway and the client and a second communication session between the security gateway and the server. Therefore, the communication session between the client and the server may be provided by two sessions, namely the first communication session between the client and the security gateway and the second communication session between the security gateway and the server. In an example embodiment, the first communication session may be a first TCP session and the second communication session may be a second TCP session.

The security gateway 210 may be configured to receive a request to establish a secure session between the client and a server from a client. The request to establish the secure session between the client and the server may be received by the security gateway 210 from the client over the first communication session. In other words, the request to establish the secure session may be received over the established non-secure communication session between the client and the security gateway 210. In an example embodiment, the request to establish the secure session may be a Client Hello message of a handshake procedure between the client and the server. The request may include a data packet having one or more client extension fields. Client security parameters may be provided in the one or more client extension fields of the data packet. In an example embodiment, the client security parameters may include one or more of the following: a client-side random number, a client cipher list, a client cipher identity, and the like. Upon receipt of the request to establish the secure session, the security gateway 210 may retrieve the client security parameters from the request and store the client security parameters into the storage unit 220.

In an example embodiment, upon receipt of the request to establish the secure session, the security gateway 210 may create a secure proxy session. The secure proxy session may be stored in the storage unit 220 and may be used to relay data packets between the first secure session and the second secure session. In an example embodiment, the security gateway 210 may store the client security parameters into the secure proxy session.

The security gateway 210 may forward, over the second communication session, the request to establish the secure session to the server. In response to forwarding the request to establish the secure session to the server, the security gateway 210 may receive a secure session response from the server. In an example embodiment, the secure session response may be a Server Hello message of the handshake procedure between the client and the server. The secure session response may include a further data packet having one or more server extension fields. The further data packet may have server security parameters provided in the one or more server extension fields. In an example embodiment, the server security parameters may include one or more of the following: a server-side random number, a server cipher list, a server cipher identity, and the like. Upon receipt of the secure session response, the security gateway 210 may retrieve the server security parameters from the secure session response and store the server security parameters into the storage unit 220. In an example embodiment, the security gateway 210 may store the server security parameters into the secure proxy session.

The security gateway 210 may be configured to receive, from the server, a server key secret. In an example embodiment, the security gateway 210 may receive the server key secret from the server in the one or more server extension fields of the secure session response. In a further example embodiment, the security gateway 210 may be configured to retrieve the server key secret from the network controller 230. Specifically, the network controller 230 may receive the server key secret from the server and store the server key secret. The security gateway 210 may send, to the network controller 230, a request to provide the server key secret. The network controller 230 may receive, from the security gateway 210, the request to provide the server key secret that is pre-stored by the server at the network controller 230. In response to the request to provide the server key secret, the network controller 230 may send the server key secret to the security gateway 210. Therefore, the receipt of the server key secret by the security gateway 210 from the server may include retrieving the server key secret from the network controller 230.

The security gateway 210 may forward the secure session response and the server key secret to the client. In response to forwarding the secure session response and the server key secret to the client, the security gateway 210 may receive a client key secret from the client and forward the client key secret to the server. In an example embodiment, the client may send the client key secret in a client key exchange message to the security gateway 210.

The client key secret may be encrypted by the client using the server key secret previously received by the client from the security gateway 210. The security gateway 210 may retrieve the client key secret from the client key exchange message. The security gateway 210 may decrypt the client key secret using the server key secret that was previously received by the security gateway 210 from the server.

The security gateway 210 may be configured to calculate a session key based on the client key secret and one of the client security parameters and the server security parameters. In an example embodiment, the session key may be a symmetric security key. The security gateway 210 may establish a first secure session between the security gateway and the server. The first secure session may be associated with the session key. Specifically, the security gateway 210 may calculate the session key for the first secure session based on the client key secret and the client security parameters. The security gateway 210 may store the session key into the storage unit 210. In an example embodiment, the security gateway 210 may store the session key into the secure proxy session. The server may calculate the session key for the first secure session based on the client key secret and the client security parameters.

The security gateway 210 may further establish a second secure session between the security gateway and the client. The second secure session may be associated with the session key. Therefore, both the first secure session and the second secure session may be associated with the same session key. The security gateway 210 may use the same session key for the second secure session. The client may calculate the session key for the second secure session based on the client key secret and the server security parameters. In an example embodiment, the security gateway 210 may calculate the session key for the second secure session based on the client key secret and the server security parameters. The security gateway 210 may store the session key generated for the second secure session into the storage unit 220. As the both the first secure session and the second secure session may be associated with the same session key, for the first secure session the security gateway 210 may the same session key as the secure key generated for the second secure session. Both the first secure session and the second secure session may include one of the following: an SSL session and a transport layer security (TSL) session.

The storage unit 220 may be in communication with the security gateway 210 and configured to store at least the session key, the client security parameters, and the server security parameters.

In an example embodiment, upon establishing the second secure session, the security gateway 210 may receive an encrypted data packet from the client over the second secure session. Specifically, the security gateway 210 may intercept the encrypted data packet sent by the client to the server. The security gateway may match the second secure session with the secure proxy session to retrieve the session key associated with the second secure session from the secure proxy session stored in the storage unit 220. The security gateway 210 may decrypt the encrypted data packet using the session key to obtain an unencrypted data packet. Upon decryption, the security gateway 210 may apply a security policy to the unencrypted data packet. In an example embodiment, the security policy may include inspection of the unencrypted data packet based on predetermined criteria. In an example embodiment, the predetermined criteria include the inspecting for malware or botnets, modifying the unencrypted data packet, forwarding the unencrypted data packet to one or more monitoring devices for the inspection, and so forth.

Upon applying of the security policy, the security gateway 210 may encrypt the unencrypted data packet into a further encrypted data packet. The security gateway 210 may perform the encryption using the session key. Upon the encryption, the security gateway 210 may send the further encrypted data packet to the server over the first secure session.

In a further example embodiment, upon establishing the first secure session, the security gateway may receive an encrypted data packet from the server over the first secure session. Specifically, the security gateway 210 may intercept the encrypted data packet sent by the server to the client. The security gateway may match the first secure session with the secure proxy session to retrieve the session key associated with the first secure session from the secure proxy session stored in the storage unit 220. The security gateway 210 may decrypt the encrypted data packet using the session key to obtain an unencrypted data packet. Upon decryption, the security gateway 210 may apply a security policy to the unencrypted data packet. Upon applying of the security policy, the security gateway 210 may encrypt the unencrypted data packet into a further encrypted data packet. The security gateway 210 may perform the encryption using the session key. Upon the encryption, the security gateway 210 may send the further encrypted data packet to the client over the second secure session.

Figure 3:
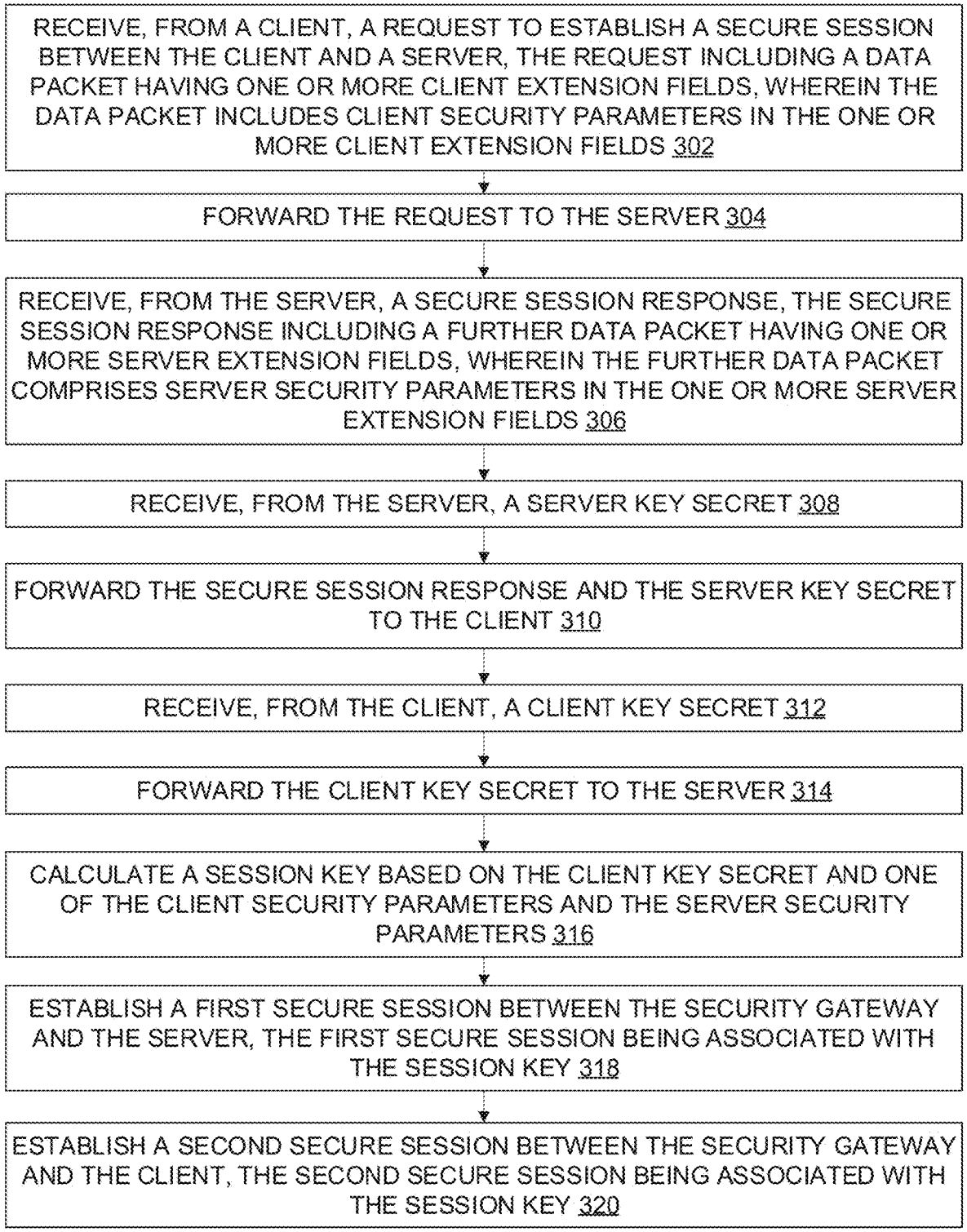
FIG. 3 is a process flow diagram of a method for establishing secure sessions, according to an example embodiment.

FIG. 3 shows a process flow diagram of a method 300 for establishing secure sessions, according to an example embodiment. In some embodiments, the operations of the method 300 may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may optionally include receiving a request for a communication session between a client and a server by a security gateway. The request for a communication session may be received from the client. The method 300 may further include establishing, by the security gateway, based on the request for the communication session, a first communication session between the security gateway and the client and a second communication session between the security gateway and the server. In an example embodiment, the first communication session may include a first TCP session and the second communication session may include a second TCP session.

The method 300 may include receiving, by a security gateway, a request to establish a secure session between a client and a server at operation 302. The request to establish the secure session may be received from the client. The request to establish the secure session may include a Client Hello message of a handshake procedure between the client and the server. In an example embodiment, the request to establish the secure session between the client and the server may be received by the security gateway over the first communication session. The request to establish the secure session may include a data packet having one or more client extension fields. The data packet may have client security parameters stored in the one or more client extension fields. The security gateway may retrieve the client security parameters from the request and store the client security parameters to a storage unit.

At operation 304, the security gateway may forward the request to establish the secure session to the server. The method 300 may continue with receiving, by the security gateway, a secure session response from the server at operation 306. The secure session response may include a Server Hello message of the handshake procedure between the client and the server. The secure session response may include a further data packet having one or more server extension fields. The further data packet may have server security parameters included into the one or more server extension fields. The security gateway may retrieve the server security parameters from the secure session response and store the server security parameters to the storage unit.

At operation 308, the security gateway may receive a server key secret from the server. In an example embodiment, the security gateway may receive the server key secret in the one or more server extension fields of the secure session response from the server. In a further example embodiment, the security gateway may retrieve the server key secret from a network controller, at which the server key secret may be pre-stored by the server.

The method 300 may further include operation 310, at which the security gateway may forward the secure session response and the server key secret to the client. At operation 312, the security gateway may receive a client key secret from the client. In an example embodiment, the security gateway may receive the client key secret in a client key exchange message sent by the client over the first secure session. The client key secret may be encrypted by the client using the server key secret. Upon receipt of the client key secret from the client, the security gateway may decrypt the client key secret using the server key secret and store the decrypted client key secret into the storage unit. Upon receipt of the client key secret, the security gateway may forward the client key secret to the server at operation 314.

At operation 316, the security gateway may calculate a session key based on the client key secret and one of the client security parameters and the server security parameters. The method 300 may continue with establishing, by the security gateway, a first secure session between the security gateway and the server at operation 318. The method 300 may further include establishing, by the security gateway, a second secure session between the security gateway and the client at operation 320. Both the first secure session and the second secure session may be associated with the session key. The server may calculate the session key for the first secure session based on the client key secret and the client security parameters. The client may calculate the session key for the second secure session based on the client key secret and the server security parameters.

In an example embodiment, the session key may be a symmetric security key. The security gateway may calculate the session key for the first secure session based on the client key secret and the client security parameters. Furthermore, the security gateway may calculate the session key for the second secure session based on the client key secret and the server security parameters.

In an example embodiment, upon receipt of the request to establish the secure session, the security gateway may create a secure proxy session to relay data packets between the first secure session and the second secure session. In this case, the security gateway may store the session key, the client security parameters, and the server security parameters to the secure proxy session.

In a further example embodiment, the method 300 may include receiving, by the security gateway, an encrypted data packet from the client over the second secure session. Upon receipt of the encrypted data packet, the security gateway may match the second secure session with the secure proxy session to retrieve the session key associated with the second secure session. After the retrieval of the session key, the security gateway may decrypt the encrypted data packet using the session key to obtain an unencrypted data packet.

The security gateway may apply a security policy to the unencrypted data packet. The method 300 may continue with encrypting, by the security gateway, the unencrypted data packet into a further encrypted data packet using the session key. The method 300 may further include sending, by the security gateway, the further encrypted data packet to the server.

Figure 4:
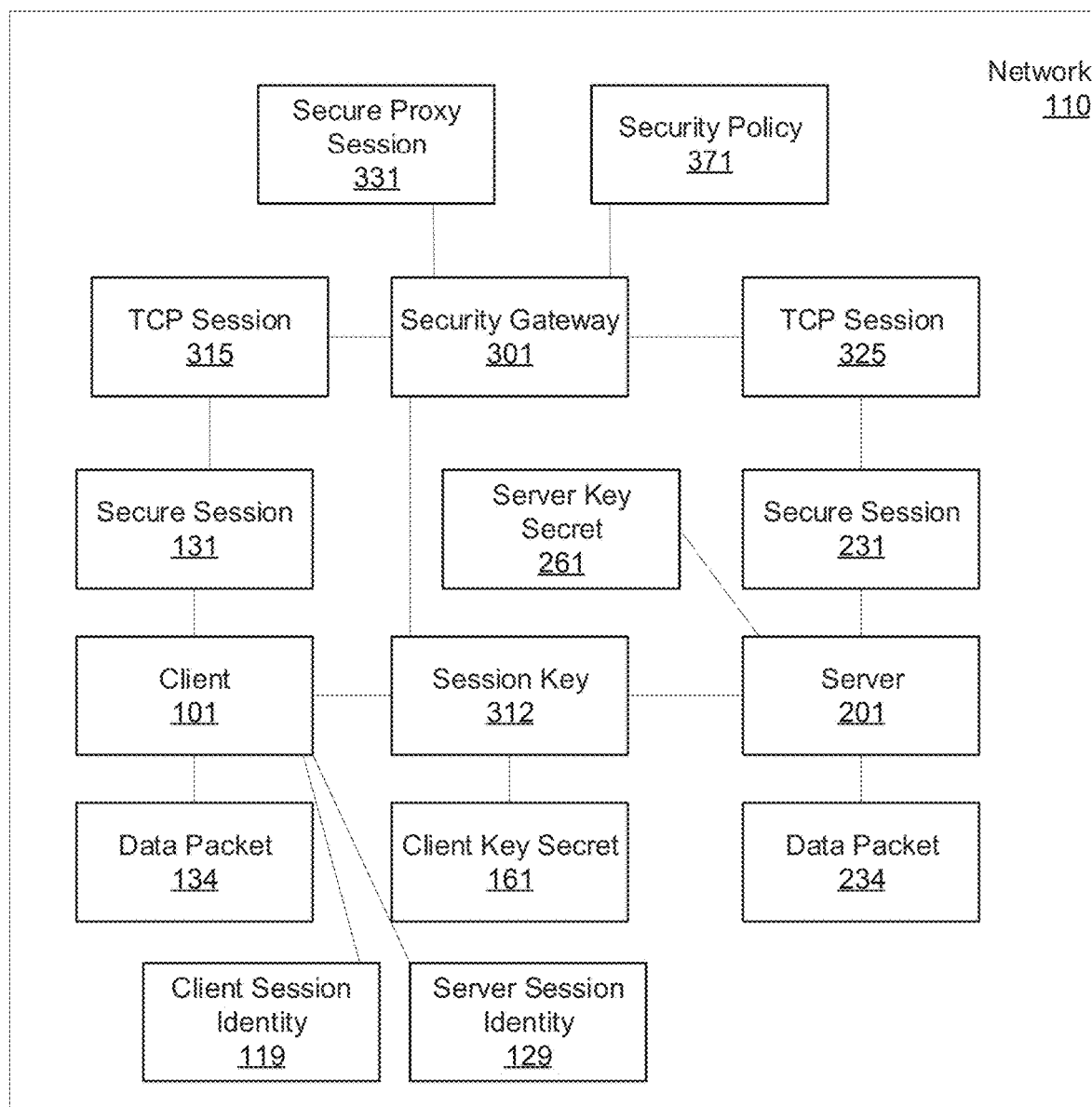
FIG. 4 is a block diagram illustrating processing of a secure session between a client and a server by a security gateway, according to an example embodiment.

FIG. 4 shows a block diagram 400 illustrating processing of a secure session between a client and a server by a security gateway, according to an example embodiment. A client device shown as client 101 may initiate establishing a secure session 131 towards a server device shown as server 201 over a data network shows as network 110. Firstly, client 101 may establish TCP session 315 with server 201 using a server session identity 129. Client 101 may use client session identity 119 associated with client 101 for TCP session 315. Security gateway 301 may establish TCP session 315 between security gateway 301 and client 101. Security gateway 301 may use server session identity 129 received from TCP session 315 to establish a TCP session 325 between security gateway 301 and server 201 over network 110. Security gateway 301 may use server session identity 129 as a destination identity for TCP session 325 and may use client session identity 119 as a source identity for TCP session 325.

Client 101 may subsequently send a request to establish secure session 131 with server 201. Specifically, client 101 may send the request over TCP session 315. Security gateway 301 may receive, over TCP session 315, the request to establish secure session 131 and relay the request to server 201 to establish a secure session 231 between security gateway 301 and server 201. In an example embodiment, security gateway 301 may create a secure proxy session 331 to relay data packets between secure session 131 and secure session 231.

Client 101 and server 201 may negotiate to determine a session key 312 for secure session 131 and secure session 231. Specifically, client 101 may send one or more client negotiation messages over TCP session 315 to security gateway 301 and security gateway 301 may relay the client negotiation messages to server 201 over TCP session 325. Similarly, server 201 may send one or more server negotiation messages over TCP session 325 to security gateway 301 and security gateway 301 may relay the server negotiation messages to client 101 over TCP session 315. During the negotiation, server 201 may send a server key secret 261 to security gateway 301. Security gateway 301 may receive server key secret 261, store server key secret 261 into secure proxy session 331, and forward server key secret 261 to client 101. In an example embodiment, upon receipt of server key secret 261, client 101 may encrypt a client key secret 161 using server key secret 261, and send encrypted client key secret 161 in the client negotiation messages to server 201. Security gateway 301 may intercept the client negotiation messages, examine the client negotiation messages, extract client key secret 161 encrypted by client 101, and decrypt client key secret 161 using server key secret 261. Subsequently, security gateway 301 may use the client key secret 161 to calculate a session key 312. Client 101 and server 201 may also calculate the same session key 312. Upon completion of establishing secure session 131 and secure session 231, client 101, server 201, and security gateway 301 may have the same session key 312 to encrypt and decrypt secure data packets over secure session 131 and secure session 231.

In an example embodiment, upon completion of establishment of secure session 131, client 101 may send a data packet 134 over secure session 131 to security gateway 301. Data packet 134 may be encrypted using session key 312 by client 101. Security gateway 301 may receive data packet 134 and decrypt data packet 134 using session key 312. In an example embodiment, security gateway 301 may inspect decrypted data packet 134 and apply security policy 371. Security gateway 301 may determine that decrypted data packet 134 does not conform to security policy 371 and, based on such determination, may decide to disconnect secure session 131. In a further example embodiment, security gateway 301 may modify decrypted data packet 134 in accordance with security policy 371. Upon the modification, security gateway 301 may encrypt modified data packet 134 using session key 312 and send encrypted modified data packet 134 to server 201 over secure session 231. In a further example embodiment, security gateway 301 may not modify decrypted data packet 134 and may send data packet 134 over secure session 231 to server 201 upon the encryption.

In an example embodiment, upon completion of establishment of secure session 231, server 201 may send a data packet 234 over secure session 231 to security gateway 301. Data packet 234 may be encrypted by server 201 using session key 312. Security gateway 301 may or may not inspect data packet 234. If the inspection is needed, security gateway 301 may decrypt the data packet 234 using the session key 312 and then re-encrypt the data packet 234 using the session key 312 before forwarding to client 101. Security gateway 301 may send data packet 234 over secure session 131 to client 101.

Figure 5:
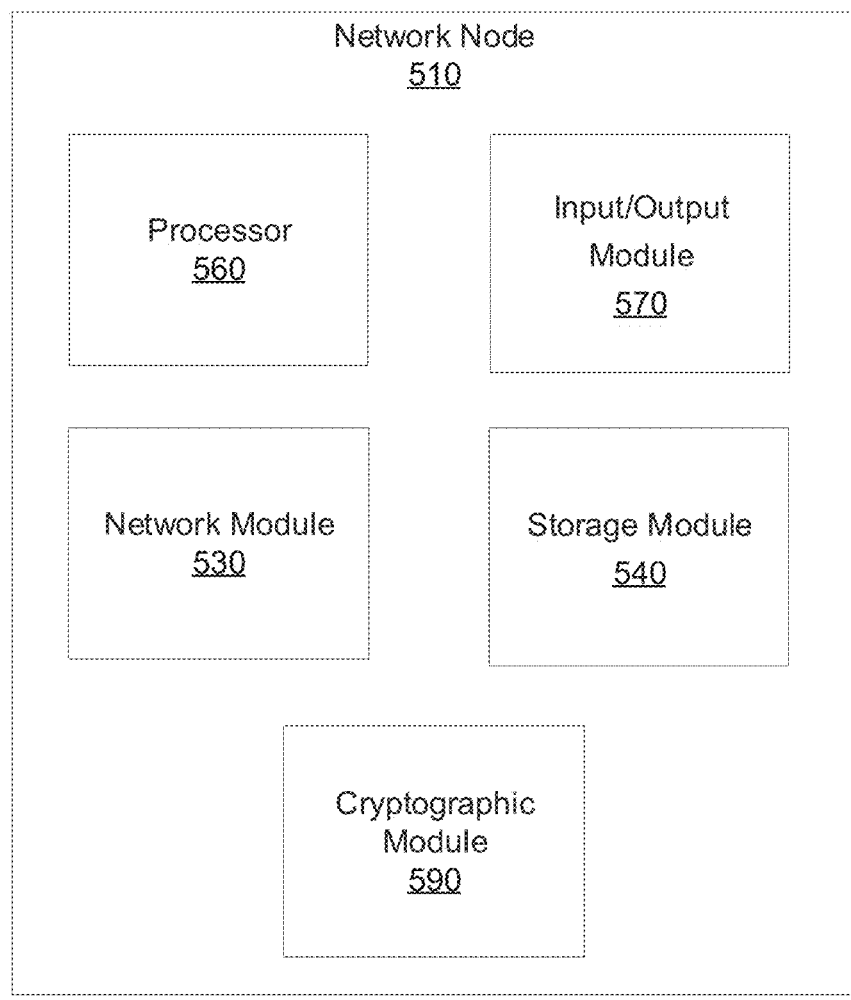
FIG. 5 is a block diagram illustrating a network node, according to an example embodiment.

FIG. 5 illustrates a network node 510 or a network computer which can be a security gateway, a client, a server, or a network controller. In an example embodiment, network node 510 may include a processor 560, a network module 530, a computer storage module 540, an input/output (I/O) module 570, and a cryptographic module 590. Processor 560 may include one or more processors which may be a micro-processor, an Intel processor, an AMD processor, a Microprocessor without Interlocked Pipeline Stages processor, a restricted instruction set computer (RISC) processor, or an Advanced RISC Machine (ARM)-based processor. In a further example embodiment, processor 560 may include one or more processor cores embedded in a processor. In an example embodiment, processor 560 may include one or more embedded processors, or embedded processing elements in a Field Programmable Gate Array, an ASIC, or Digital Signal Processor.

In an example embodiment, network module 530 may include a network interface such as Ethernet, optical network interface, a wireless network interface, T1/T3 interface, a WAN or LAN interface. In an example embodiment, network module 530 may include a network processor.

In an example embodiment, storage module 540 may include random access memory (RAM), dynamic random-access memory, static random access memory, Synchronous Dynamic Random Access Memory, or memory utilized by processor module 560 or network module 530.

In an example embodiment, storage module 540 may store data utilized by processor 560. Storage module 540 may include a hard disk drive, a solid state drive, an external disk, or a readable external disk. Storage module 540 may store one or more computer programming instructions which, when executed by processor 560 or network module 530, implement one or more of the functionality of this present invention. In an example embodiment, the storage module 540 may serve as a storage unit 220 shown on FIG. 2.

Input/output (I/O) module 570 may include a keyboard, a keypad, a mouse, a gesture based input sensor, a microphone, a physical or sensory input peripheral, a display, a speaker, or a physical or sensual output peripheral. Cryptographic module 590 may include one or more hardware-based cryptographic computing modules to perform data encryption and/or decryption.

Returning to FIG. 4, in an example embodiment, client 101 may be a network node as illustrated in FIG. 5 and may be connected to network 110. Client 101 may include a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising at least a network module and at least one processor.

In an example embodiment, server 201 may be a network node as illustrated on FIG. 5 and may be connected to network 110. In an example embodiment, secure session 131 or secure session 231 may include a secure session to support an SSL- or TLS-based application communication session such as a HTTP session, a file transfer session, a remote access session, a FTP session, a virtual network computing session, a remote desktop session, or any server application supporting SSL or TLS protocol.

In an example embodiment, security gateway 301 may be a network node illustrated in FIG. 5. In an example embodiment, security gateway 301 may include a plurality of programming instructions, which, when executed by one or more processors, may exchange data packets according to a security protocol such as SSL or TLS protocol. In an example embodiment, security gateway 301 may use a hardware-based cryptographic module to process encryption and decryption of data. In an example embodiment, security gateway 301 may include one or more other network appliance or security gateway functionality such as traffic management, network address translation, firewall, HTTP proxy, TCP proxy, service load balancing, or application delivery controller.

In an example embodiment, server session identity 129 may include an IP address of a network service or an IP address of server 201. Server session identity 129 may further include a TCP port number of a secured network application, or a TCP port number of a secure web server application.

In an example embodiment, client session identity 119 may include an IP address of client 101. Client session identity 119 may further include a TCP port number of TCP session 315.

In an example embodiment, server key secret 261 may include a crypto key used by server 201 to decrypt a piece of encrypted data from client 101. In an example embodiment, server key secret 261 may be an asymmetric key. In a further example embodiment, server key may be a symmetric key used to encrypt and decrypt a piece of data or a data packet.

In an example embodiment, security policy 371 may include a condition and an action. The condition of security policy 371 may include one or more of a condition related to a web service request, an HTTP request, server session identity, client session identity, a user identity based on an HTTP cookie, a session identity based on an HTTP cookie, a value of an HTTP cookie, an URL in an HTTP request, or an identified pattern or expression in a web service request. The action of security policy 371 may include one or more of the following actions: inserting an HTTP cookie, modifying an HTTP header, rejecting a web service request, rejecting an HTTP request, relaying the request, and so forth.

Figure 6:
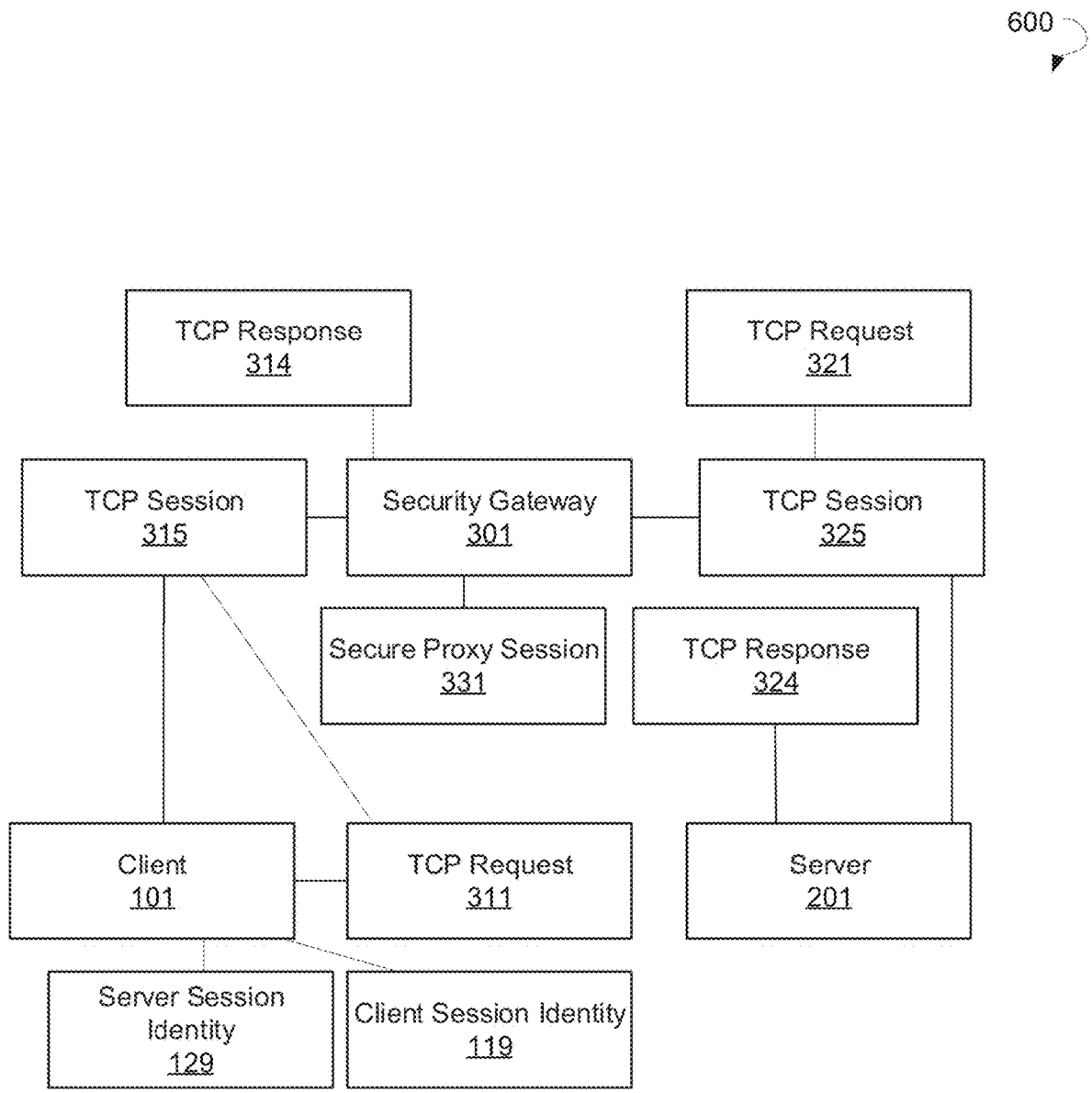
FIG. 6 is a block diagram illustrating establishment of a Transmission Control Protocol (TCP) session between a client and a server via a security gateway, according to an example embodiment.

FIG. 6 is a block diagram 600 illustrating establishment of a TCP session between a client and a server via a security gateway, according to an example embodiment. Client 101 may send a TCP request 311 to server 201 to establish TCP session 315. Client 101 may include client session identity 119 and server session identity 129 into TCP request 311. Security gateway 301 may intercept the TCP request 311. Upon the receipt of TCP request 311, security gateway 301 may retrieve server session identity 129 from TCP request 311. Security gateway 301 may also retrieve client session identity 119 from TCP request 311 and establish the TCP session 315 between security gateway 301 and client 101. Security gateway 301 may generate a TCP request 321 using client session identity 119 and server session identity 129 and send TCP request 321 to server 201 to establish TCP session 325 between security gateway 301 and server 201.

In an example embodiment, server 201 may send a TCP response 324 to accept establishment of TCP session 325. Security gateway 301 may receive TCP response 324 from server 201 and complete establishment of TCP session 325. Based on acceptance of TCP session 325 with server 201, security gateway 301 may send, to server 201, a TCP response 324 indicating acceptance of TCP session 315. In an example embodiment, security gateway 301 may create a secure proxy session 331 for storing data associating TCP session 315 between security gateway 301 and client 101 and TCP session 325 between security gateway 301 and server 201. Specifically, security gateway 301 may store information associated with TCP session 315 and information associated with TCP session 325 in secure proxy session 331.

Figure 7:
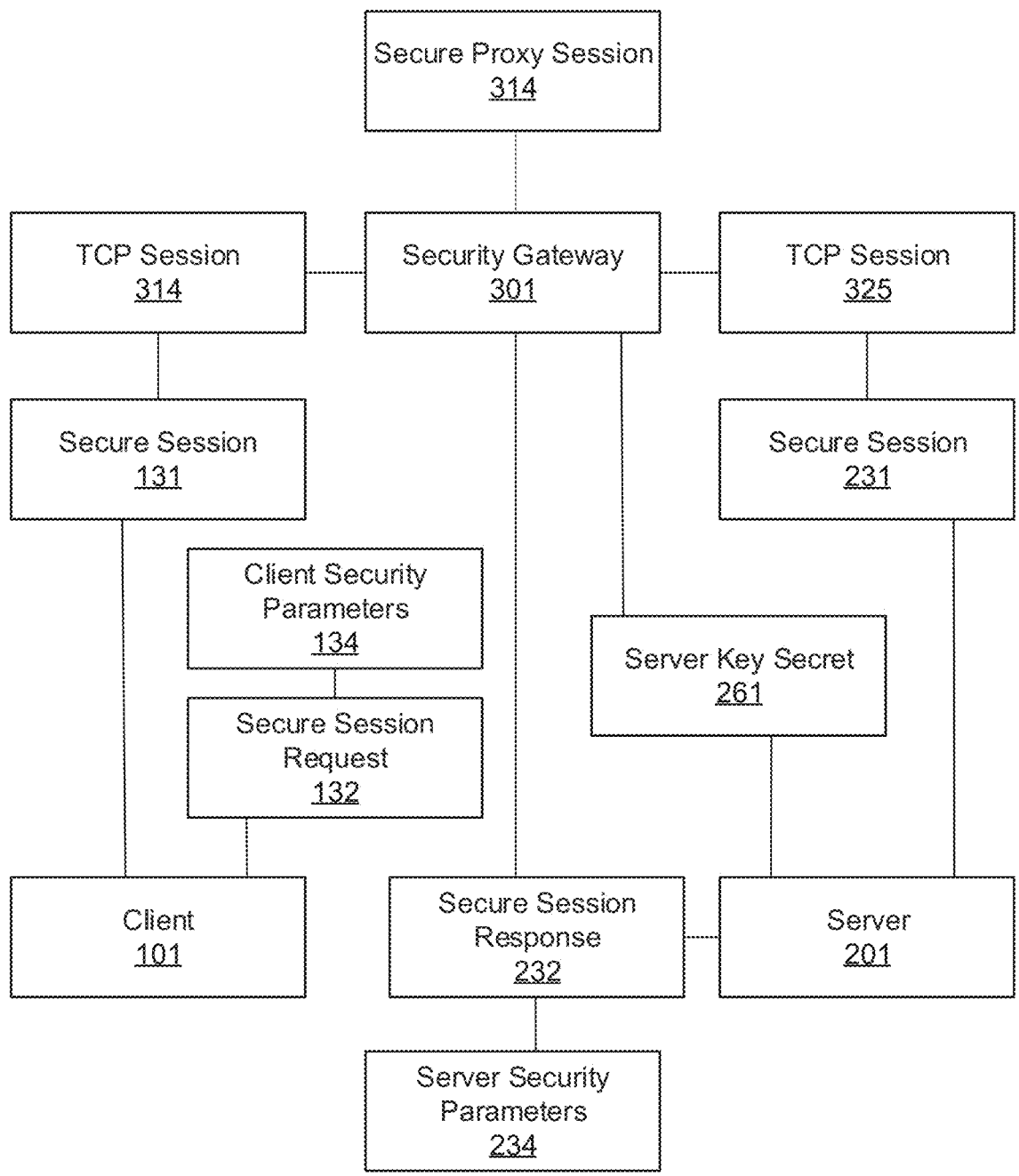
FIG. 7 is a block diagram illustrating processing of initial secure session negotiation messages, according to an example embodiment.

FIG. 7 is a block diagram 700 illustrating processing of initial secure session negotiation messages, according to an example embodiment. Upon establishing TCP session 315, client 101 may send a secure session request 132 to security gateway 301 over TCP session 315 to establish a secure session with server 201. Security gateway 301 may receive secure session request 132 over TCP session 315 and match TCP session 315 with secure proxy session 331 to select, based on the matching, an associated TCP session 325. Security gateway 301 may send secure session request 132 over TCP session 325 to server 201 to establish secure session 231 between security gateway 301 and server 201. In an example embodiment, secure session request 132 sent by client 101 may include client security parameters 134. Security gateway 301 may retrieve client security parameter 134 and store client security parameters 134 into secure proxy session 331. In an example embodiment, client security parameters 134 may include one or more of a client-side random number, a client cipher list, a client cipher identity, or other data client 101 may send for calculating a session key to be used for the secure session.

In an example embodiment, server 201 may receive secure session request 132 from security gateway 301. Server 201 may respond with a secure session response 232 to negotiate a session key for secure session 231. In an example embodiment, server 201 may insert one or more server security parameters 234 into secure session response 232. In an example embodiment, secure session response 232 may include a Server Hello message. Server security parameters 234 may include one or more of a server-side random number, a server cipher identity, and/or other data. Server 201 may send secure session response 232 over TCP session 325 towards security gateway 301. Security gateway 301 may receive secure session response 232, retrieve server security parameters 234 from secure session response 232, and store server security parameters 234 into secure proxy session 331. Security gateway 301 may send secure session response 234 over TCP session 315 to client 101.

Figure 8:
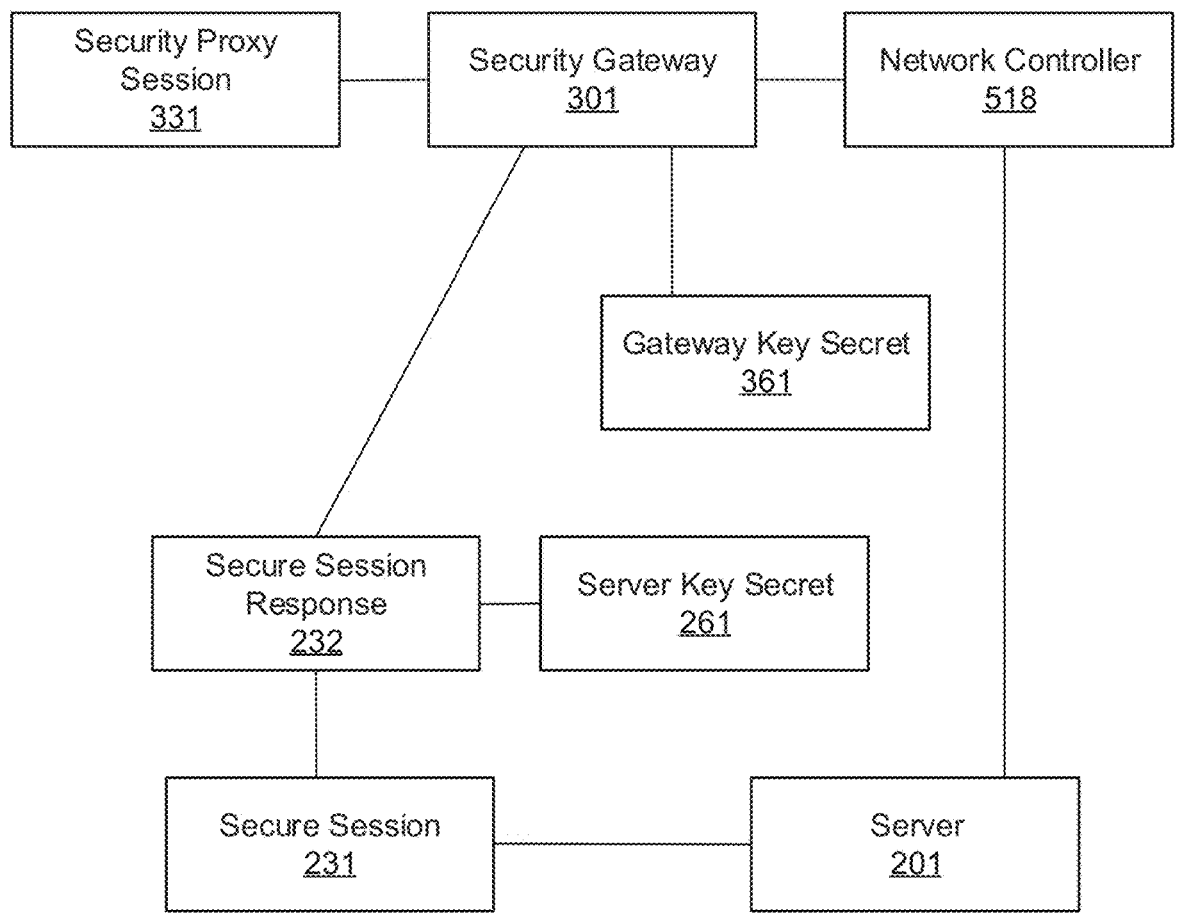
FIG. 8 is a block diagram illustrating sharing a server key secret between a server and a security gateway, according to an example embodiment.

In an example embodiment, server 201 may send a server key secret 261 to security gateway 301. Security gateway 301 may use server key secret 261 later for decrypting client key secret encrypted by client 101. Server 201 may provide server key secret 261 to security gateway 301 either by sending in secure session response 232 or by storing the server key secret 261 at a network controller, or using any other means. FIG. 8 illustrates an example embodiment of delivery of server key secret 261 to security gateway 301.

In an example embodiment, security gateway 301 may receive secure session response 232 from server 201 and retrieve data from secure session response 232. Subsequently, if server key secret 261 was not present in secure session response 232, security gateway 301 may proceed to receive server key secret 261 from the network controller. In an example embodiment, upon successfully receiving server key secret 261, security gateway 301 may send secure session response 232 and server key secret 261 to client 101 over TCP 315.

Upon receipt of the secure session response 232 from server 201, security gateway 301 may establish secure session 231 with server 201. Upon forwarding the secure session response 232 to client 101, security gateway 301 may establish secure session 131 with client 101. Each of secure session 131 and secure session 231 may include an SSL session or a TLS session.

In an example embodiment, server 201 may send an additional secure session response to exchange addition information with client 101. Server 201 may seek a client security certificate in the additional secure session response. In a further example embodiment, server 201 may request for the client security certificate in the secure session response 232.

FIG. 8 is a block diagram 800 illustrating sharing a server key secret between a server and a security gateway, according to an example embodiment. Server 201 may send server key secret 261 to security gateway 301. Specifically, server 201 may send server key secret 261 in a secure session response 232. In an example embodiment, secure session response 232 may include a Server Hello message, and server 201 may encode server key secret 261 into one or more extension fields of a Server Hello message. In an example embodiment, secure session 325 may be a TLS session and server 201 may encode server key secret 261 into a TLS extension field. In an example embodiment, the extension fields may include an extension type with a value indicating server key secret 261, different from other extension type, an extension data length, for example, an integer to indicate the size of data associated with server key secret 261.

In an example embodiment, security gateway 301 may be configured with gateway key secret 361. In an example embodiment, security gateway 301 may obtain gateway key secret 361 from a network controller 518. Server 201 may have an access to gateway key secret 361. In an example embodiment, server 201 may obtain gateway key secret 361 from a network controller 518. In an example embodiment, server 201 may encrypt server key secret 261 using gateway key secret 361 prior encoding server key secret 261 into extension field of secure session response 232.

In an example embodiment, security gateway 301 may receive secure session response 232 for secure session 231 and retrieve the encrypted server key secret 261. Security gateway 301 may decrypt the encrypted server key secret 261 using a pre-stored gateway key secret 361. Upon calculating server key secret 261, security gateway 301 may store server key secret 261 into secure proxy session 331 associated with secure session 231.

In an example embodiment, gateway key secret 361 may include a symmetric key. Security gateway 301 and server 201 may use the same gateway key secret 361. In a further example embodiment, gateway key secret 361 may include an asymmetric key. Server 201 may have a public portion of gateway key secret 361 in order to encrypt server key secret 261, whereas security gateway 301 may have a private portion of gateway key secret 361 in order to decrypt server key secret 261 encrypted using gateway key secret 361.

Figure 9:
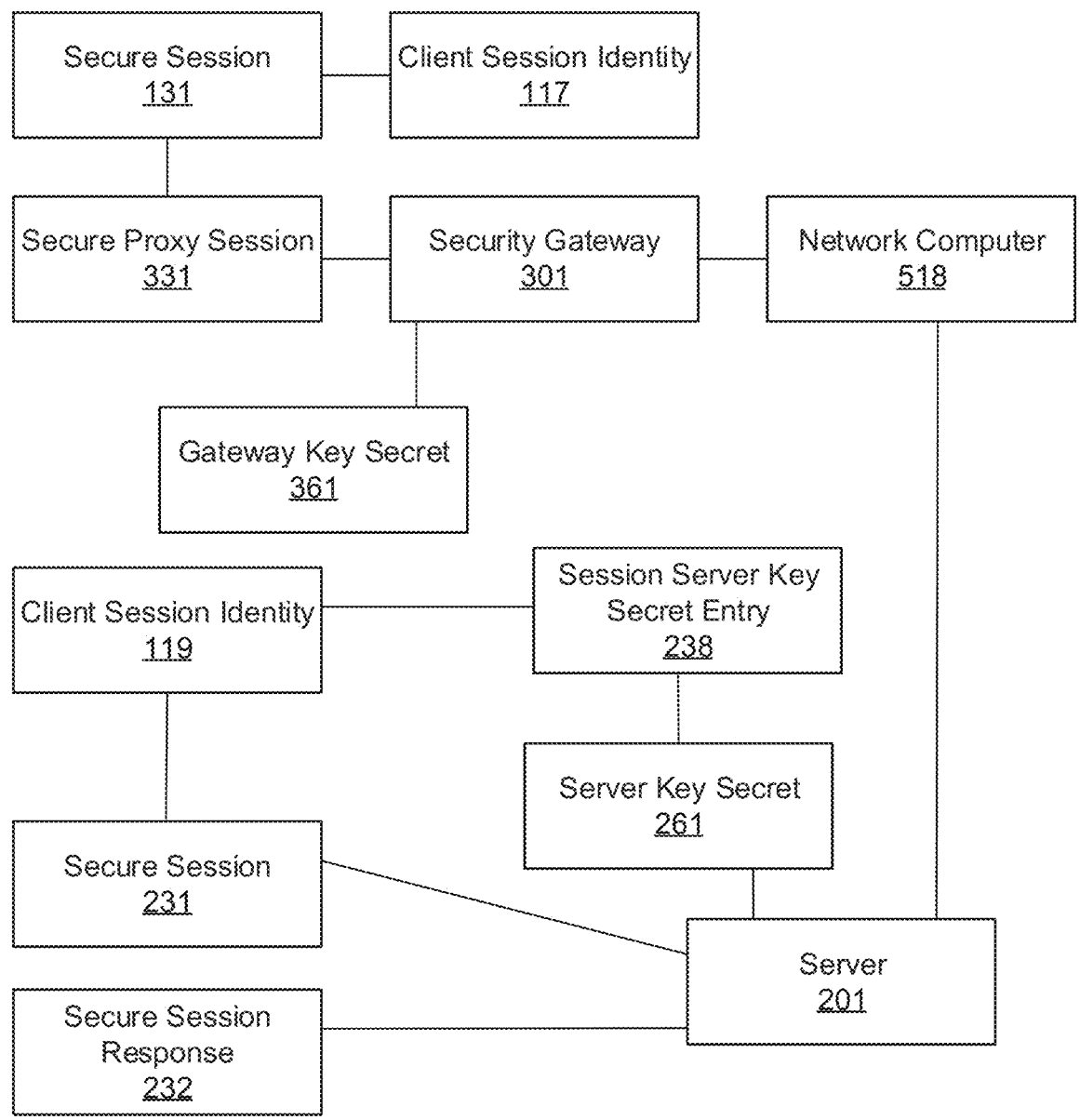
FIG. 9 is a block diagram illustrating sharing a server key secret between a server and a security gateway using a network controller, according to an example embodiment.

FIG. 9 is a block diagram 900 illustrating sharing a server key secret between a server and a security gateway using a network controller, according to an example embodiment. Server 201 may send server key secret 261 to a network controller 518. Server 201 may generate a session server key secret entry 238 and include server key secret 261 and client session identity 119 into session server key secret entry 238. In an example embodiment, client session identity 119 may include information associated with TCP session, such as client IP address and client TCP port number retrieved from TCP session 325. In an example embodiment, server 201 may encrypt server key secret 261 using a pre-determined gateway key secret 361 shared with security gateway 301, as illustrated above, prior to storing encrypted server key secret 261 into session server key secret entry 238. In an example embodiment, server key secret 261 stored in session server key secret entry 238 may be not encrypted.

In an example embodiment, security gateway 301 may retrieve, from network controller 518, session server key secret entry 238. Security gateway 301 may connect to network controller 518 after receiving secure session response 232 from server 201. In an example embodiment, network controller 518 may connect to security gateway 301 after receiving session server key secret entry 238 from server 201.

In an example embodiment, security gateway 301 may receive session server key secret entry 238 from network controller 518, retrieve client session identity 119, and match client session identity 119 against secure proxy session 331 to match client session identity stored in secure session 131. Security gateway 301 may find a match between client session identity 119 and client session identity associated with secure session 131. Security gateway 301 may determine that session server key secret entry 238 is associated with secure proxy session 331. Security gateway 301 may retrieve server key secret 261 from session server key secret entry 238 and store server key secret 261 into secure proxy session 331. In an example embody, server key secret 261 may be encrypted. Security gateway 301 may store the encrypted server key secret 261 into session server key secret entry 238. In an example embodiment, security gateway 301 may decrypt encrypted server key secret 261 using gateway key secret 361 to obtain decrypted server key secret 261.

Figure 10:
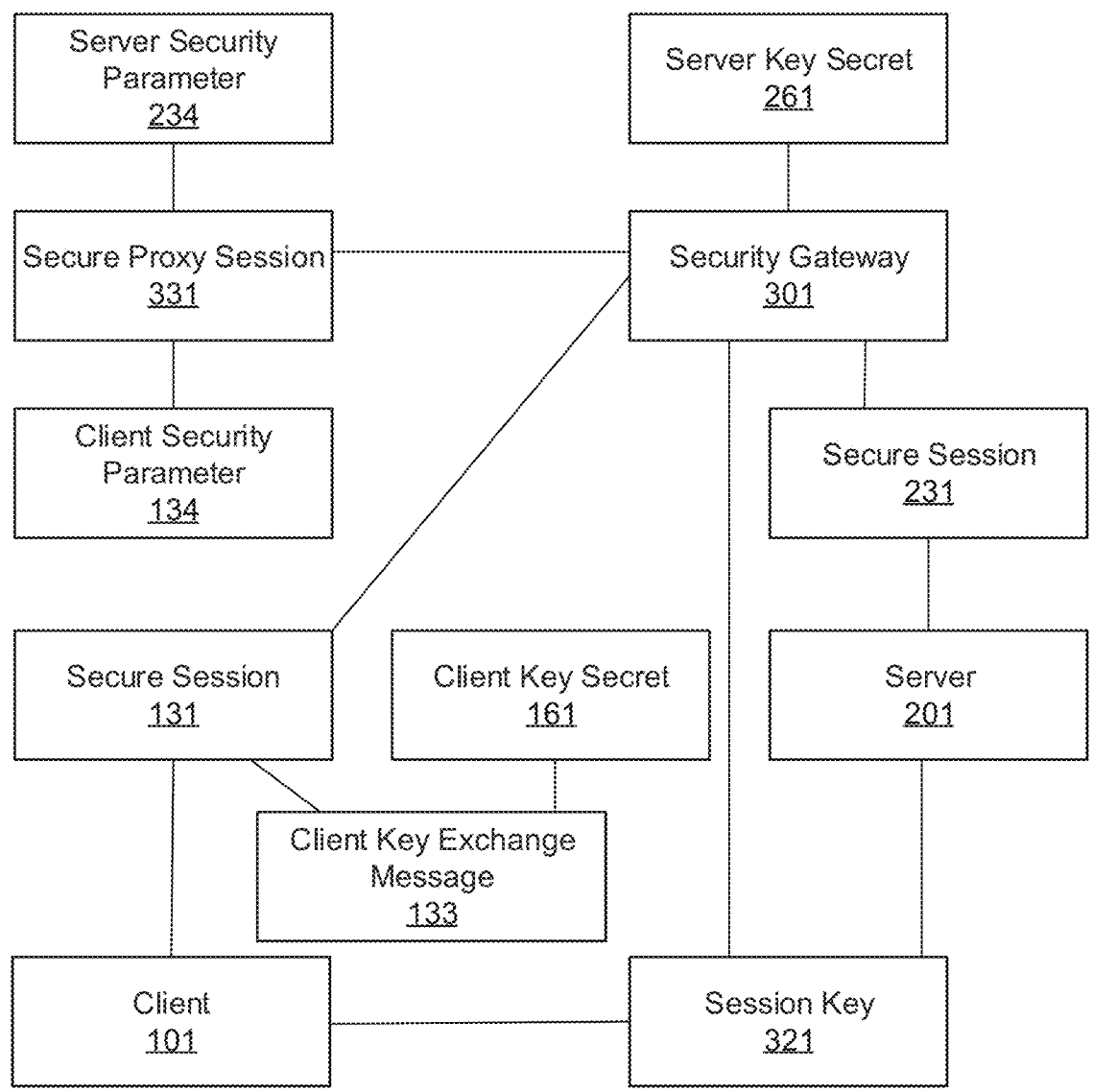
FIG. 10 a block diagram illustrating generation of a symmetric session key, according to an example embodiment.

FIG. 10 is a block diagram 1000 illustrating generation of a symmetric session key. Client 101 may encrypt client key secret 161 using information in a server key secret received previously by client 101 in a secure session response from server 201, as illustrated on FIG. 9. Client 101 may generate a client key secret 161 for secure session 131 and send client key secret 161 in a client key exchange message 133 to server 201. In an example embodiment, client key secret 161 may include a client Premaster secret. Client 101 may send client key exchange message 133 over secure session 131 to security gateway 301. Upon receiving client key exchange message 133 from client 101 over secure session 131, security gateway 301 may retrieve encrypted client key secret 161 from the client key exchange message 133. Furthermore, security gateway 301 may retrieve server key secret 261 from secure proxy session 331 and use server key secret 261 to decrypt encrypted client key secret 161. In an example embodiment, security gateway 301 may store client key secret 161 into secure proxy session 331. Security gateway 301 may retrieve, from secure proxy session 331, previously stored client security parameter 134 and server security parameter 234. Security gateway 301 may calculate a session key 312 using client key secret 161 and one of client security parameters 134 and server security parameters 234.

Upon receiving client key exchange message 133, security gateway 301 may send client key exchange message 133 over secure session 231 to server 201. Server 201 may receive client key exchange message 133 and decrypt client key secret 161 contained in client key exchange message 133. Server 201 may further calculate session key 312 using client key secret 161 and client security parameter 134 obtained from a secure session request message received previously by server 201. Similarly, client 101 may calculate session key 312 using client key secret 161 and server security parameters 234 obtained from a secure session response message received previously by client 101.

In an example embodiment, session key 312 may be a symmetric security key and may be used to encrypt and decrypt data messages to be sent over secure session 131 and secure session 231.

In a further example embodiment, security device 201 and client 101 may send a secure session negotiation completion message or secure session finish message over secure session 231 and secure session 131, respectively. Security gateway 301 may relay client secure session finish message received from client 101 over secure session 131 to server 201 over secure session 231. Similarly, security gateway 301 may relay server secure session finish message received from server 201 over secure session 231 to client 101 over secure session 131. Client 101 and security gateway 301 may complete establishing secure session 131 between client 101 and security gateway 301, and server 201 and security gateway 301 may complete establishing secure session 231 between server 201 and security gateway 301.

Figure 11:
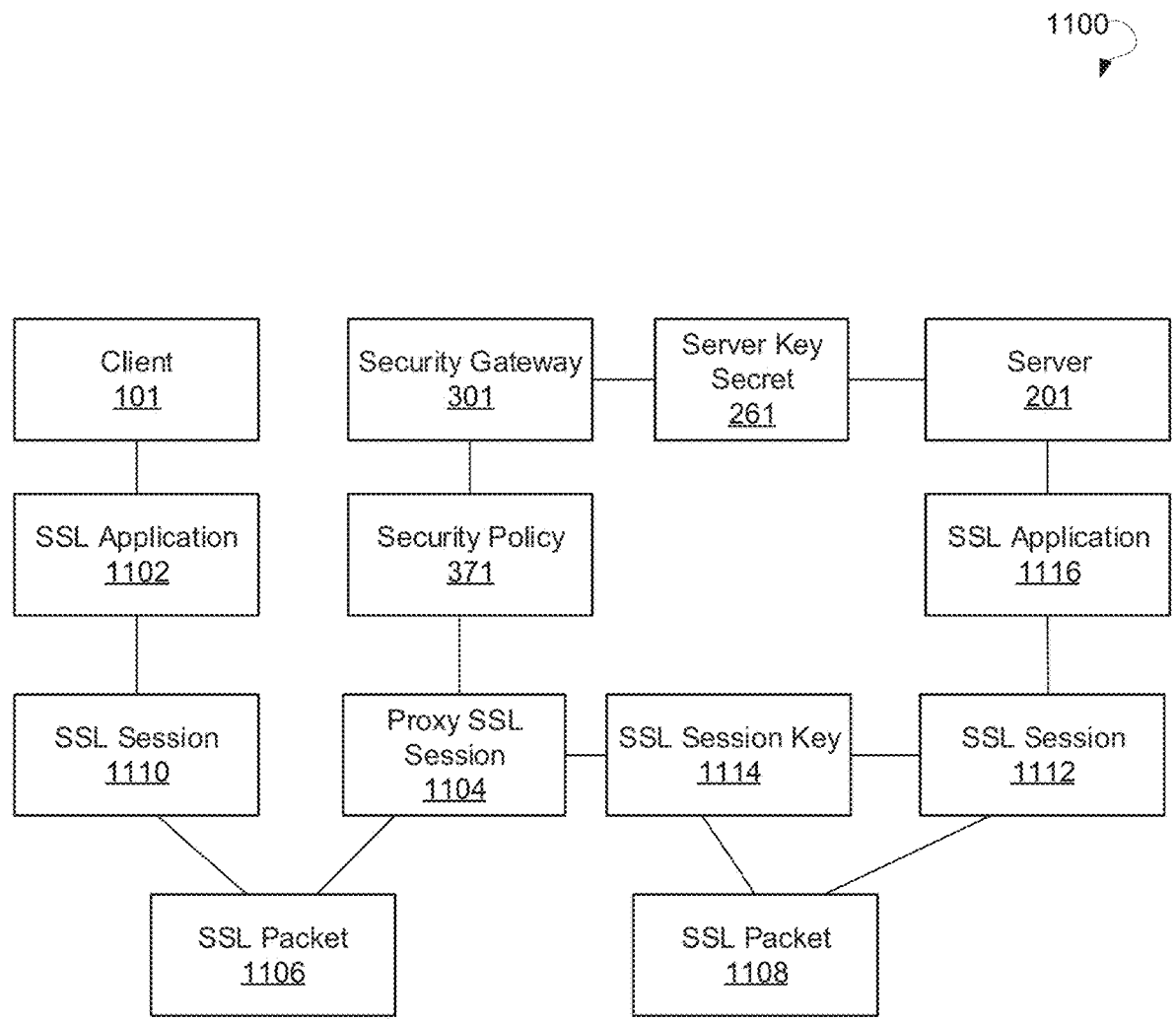
FIG. 11 is a block diagram illustrating establishment of a secure session when the secure session is an SSL session, according to an example embodiment.

FIG. 11 is a block diagram 1100 illustrating establishment of a secure session when the secure session is an SSL session, according to an example embodiment. Security gateway 301 may have a TCP session established with client 101 and a further TCP session established with server 201. Client 101 may send, per request of an SSL application 1102 associated with client 101, an SSL session request shown as SSL packet 1106, via security gateway 301, towards server 201. Security gateway 301 may forward SSL session request in a form of an SSL packet 1108 to an SSL application 1116 associated with server 201. Furthermore, security gateway 301 may create a proxy SSL session 1104 to store data packets associated with an SSL session 1110 between client 101 and security gateway 301 and an SSL session 1112 between server 201 and security gateway 301. Specifically, security gateway 301 may establish SSL session 1110 and SSL session 1112 after an SSL handshake procedure between client 101 and server 201. Specifically, server 201 and client 101 may exchange SSL handshake messages. Security gateway 301 may relay SSL handshake messages between the two TCP sessions, and capture client security parameters, e.g., in a form of a client random number, and server security parameters, e.g., in a form of server random number, from the SSL handshake messages. Furthermore, server 201 may provide a server key secret 261 to security gateway 301. Security gateway 301 may provide server key secret 261 to client 101. Furthermore, security gateway 301 may use server key secret 261 to decrypt client key secret received from client 101. Specifically, client 101 may encrypt client key secret using server key secret 261 and send the encrypted client key secret to security gateway 301. Security gateway 301 may calculate an SSL session key 114 based on the client key secret and one of the client security parameters and the server security parameters. Specifically, for SSL session 1110, security gateway 301 may calculate SSL session key 114 based on the client key secret and the server security parameters. Similarly, for SSL session 1112, security gateway 301 may calculate SSL session key 114 based on the client key secret and the client security parameters. Upon calculating SSL session key 114, security gateway 301 may continue relaying SSL handshake messages to complete establishment of SSL session 1110 with client 101 and establishment of SSL session 1112 with server 201. Upon establishing SSL session 1110 and SSL session 1112, security gateway 301 may apply security policy 371 to data packets associated with SSL session 1110 and data packets associated with SSL session 1112.

Figure 12:
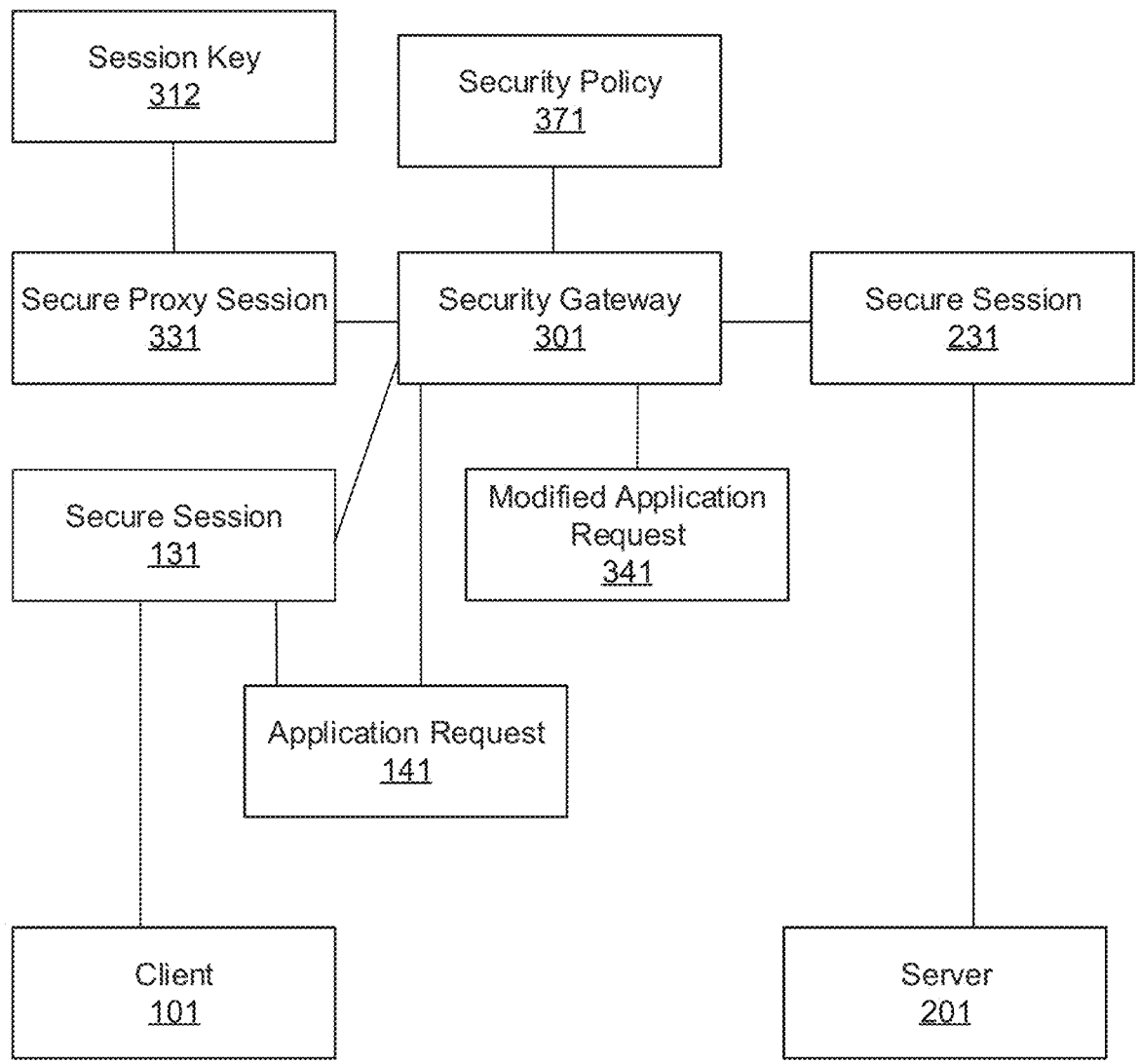
FIG. 12 is a block diagram illustrating application of a security policy to an application request over a secure session, according to an example embodiment.

FIG. 12 is a block diagram 1200 illustrating application of security policy to an application request over a secure session. Client 101 may send an application request 141 over secure session 131 to server 201. Client 101 may encrypt application request 141 using session key 312 for secure session 131. Security gateway 301 may receive encrypted application request 141 over secure session 131. Upon receipt of the encrypted application request 141 from client 101, security gateway 301 may match secure session 131 to secure proxy session 331 and retrieve session key 312 from secure proxy session 331. Security gateway 301 may use session key 312 to decrypt application request 141. In an example embodiment, security gateway 301 may have a pre-stored security policy 371 and may apply security policy 371 to application request 141.

In an example embodiment, security gateway 301, upon applying security policy 371, may modify application request 141 into modified application request 341. Upon modifying, security gateway 301 may encrypt modified application request 341 using session key 312 and send encrypted modified application request 341 over secure session 231 to server 201.

In a further example embodiment, upon applying security policy 371, security gateway 301 may determine that application request 141 is not a threat and may send encrypted application request 141 over secure session 231 to server 201. In an example embodiment, security gateway 301 may send encrypted application request 141 received from client 101 to server 201. In a further example embodiment, security gateway 301 may use session key 312 to re-encrypt application request 141 and may send the application request 141 re-encrypted by the security gateway 301 to server 201.

In an example embodiment, upon applying security policy 371, security gateway 301 may determine that application request 141 is a threat. In this case, security gateway 301 may discard application request 141 and disconnect secure session 131. In an example embodiment, security gateway 301 may also disconnect secure session 231.

Figure 13:
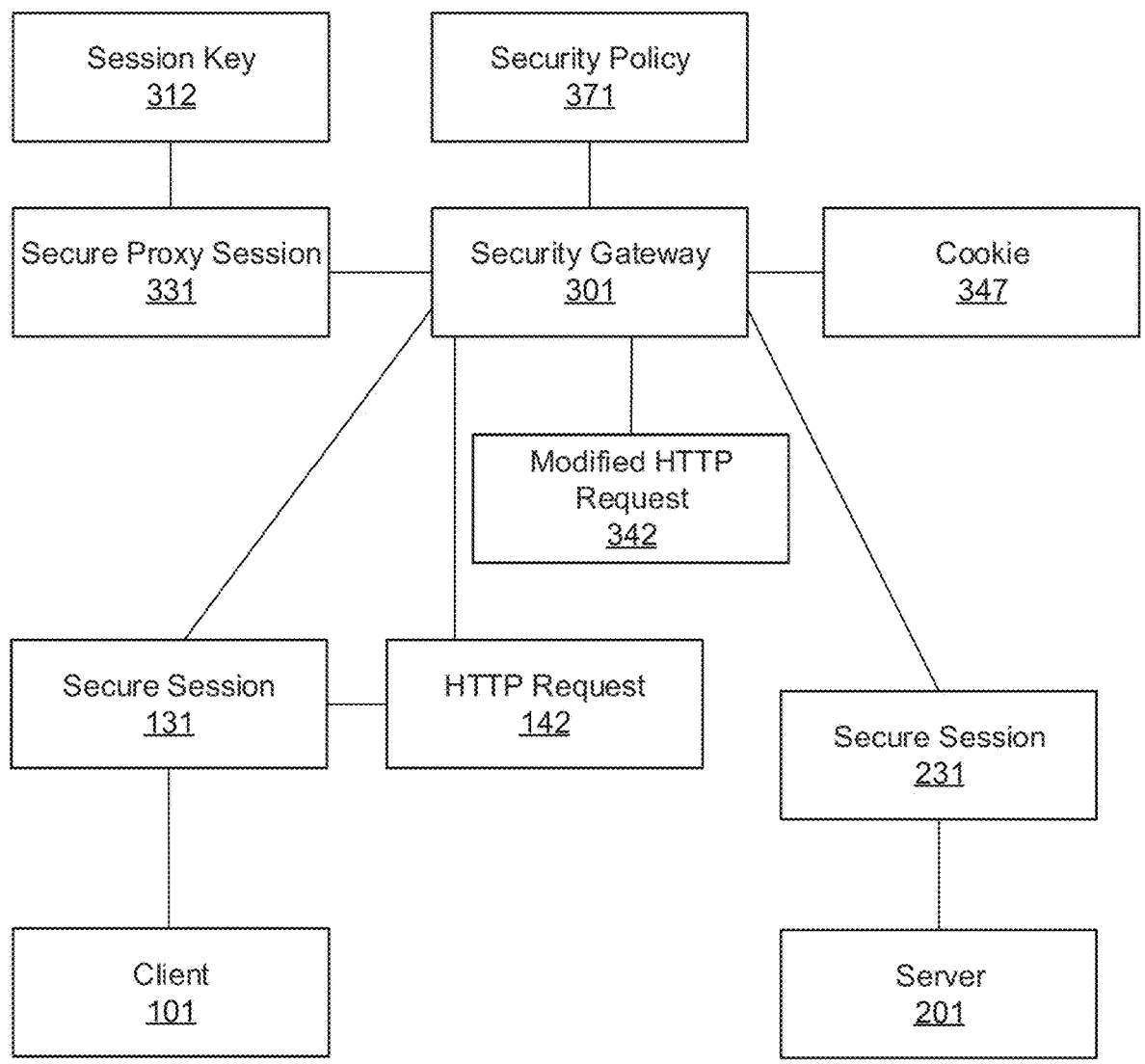
FIG. 13 is a block diagram illustrating application of a security policy to an HTTP request over a secure session, according to an example embodiment.

In an example embodiment, application request 141 is a web-based application request. FIG. 13 illustrates an embodiment to process a web-based application request.

FIG. 13 is a block diagram 1300 illustrating application of security policy to an HTTP request over a secure session. Client 101 may send an encrypted HTTP request 142 over secure session 131 to security gateway 301. Upon receiving encrypted HTTP request 142 over secure session 131, security gateway 301 may match secure session 131 to secure proxy session 331 and retrieve session key 312 from secure proxy session 331. Security gateway 301 may use session key 312 to decrypt received encrypted HTTP request 142. Upon the decryption, security gateway 301 may apply security policy 371 to process HTTP request 142. In an example embodiment, HTTP request 142 may include a GET request and one or more cookies. In an example embodiment, security policy 371 may include one or more security conditions relating to HTTP cookies in a GET request. Security gateway 301 may match cookies in the GET request of HTTP request 142 against the security conditions in security policy 371.

In an example embodiment, security gateway 301 may determine that there is no match. Upon determining that no match is found, security gateway 301 may determine that HTTP request 142 is not a threat. Security gateway 301 may send encrypted HTTP request 142 over secure session 231 to server 201. In a further example embodiment, upon determining that no match is found, security gateway 301 may determine that HTTP request 142 is a threat. In this case, security gateway 301 may discard HTTP request 142 and disconnect secure session 131.

In an example embodiment, security gateway 301 may determine that there is a match and apply an action to modify HTTP request 142 according to security policy 371. In a further example embodiment, no modification may be necessary according to security policy 371. Security gateway 301 may send encrypted HTTP request 142 over secure session 231 to server 201. In an example embodiment, security policy 371 may indicate that a modification is required. In this case, security policy 371 may perform the modification by inserting one or more cookie 347 to HTTP request 142. In an example embodiment, security gateway 301 may insert cookie 347 into a header of HTTP request 142. Security gateway 301 may then encrypt HTTP request 142 using session key 312 to obtain modified HTTP request 342 and may send encrypted modified HTTP request 342 over secure session 231 to server 201.

In an example embodiment, HTTP request 142 may include a GET request for /index.html HTTP/1.1, for host 'www.example.org', and cookies 'theme=light; sessionToken=DA5F5D288A481277'. Security policy 371 may include a rule for "GET request/index.html; host 'www.example.org'; cookies 'theme=light; sessionToken=DA5F5Dxxxxxxxxxx'" with an action to insert cookie 347 'valid-client=yes; risk-level=medium; priority=high'.

In an example embodiment, HTTP request 142 may include a GET request for /index.html HTTP/1.1, for host 'www.example.org', and cookies 'theme=light; sessionToken=DA5G5D288A481277'. Security policy 371 may include a rule for "GET request/index.html; host 'www.example.org'; cookies 'theme=light; sessionToken=DA5G5D288xxxxxxx'" with an action to insert cookie 347 'valid-client=no; risk-level=high; priority=low", suggesting that HTTP request 142 is of a high security risk.

Figure 14:
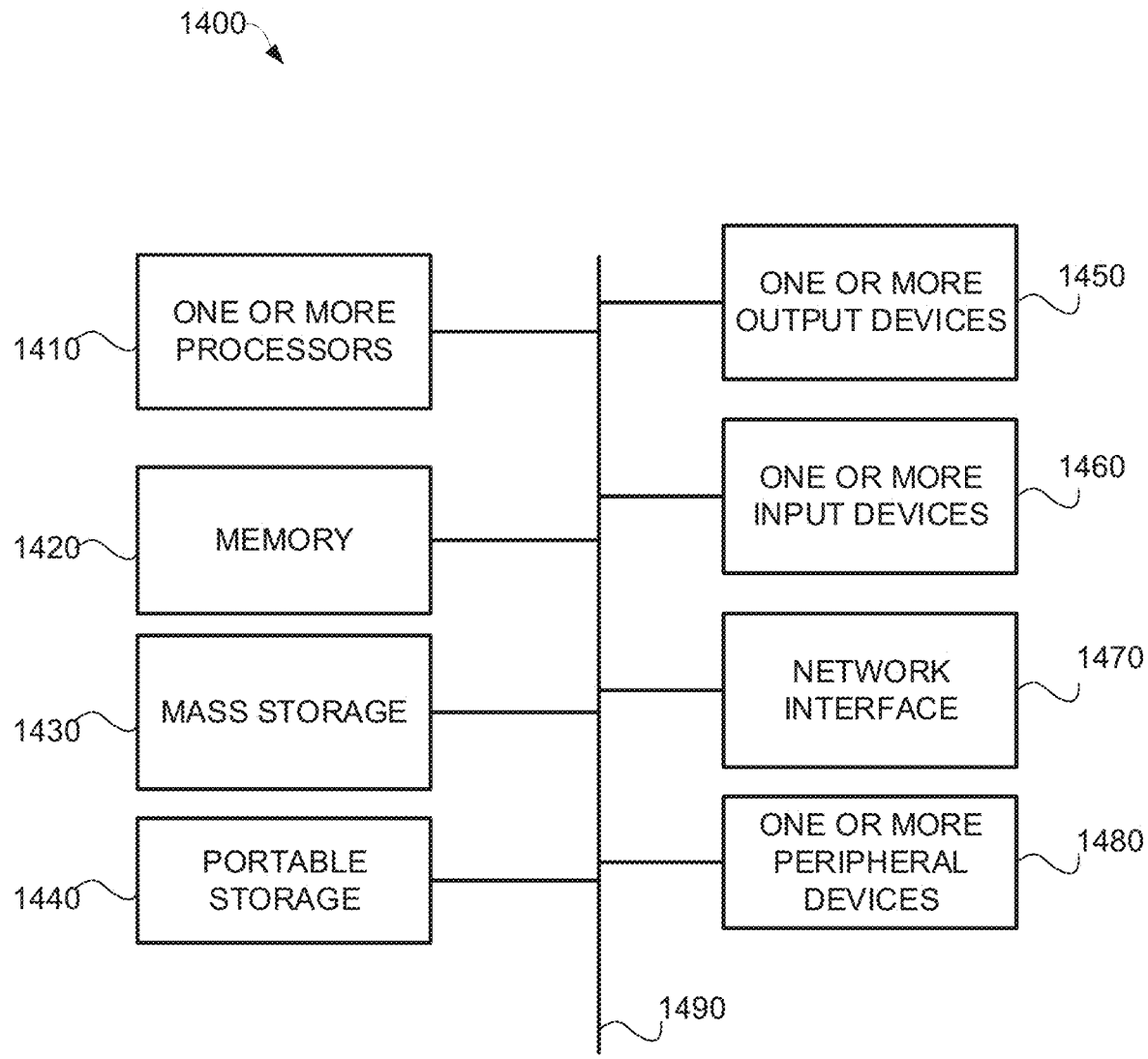
FIG. 14 shows a diagrammatic representation of a computing device for a machine, within which a set of instructions for causing the machine to perform any one or more of the methodologies discussed herein can be executed.

FIG. 14 illustrates an example computer system 1400 that may be used to implement embodiments of the present disclosure. The computer system 1400 may serve as a computing device for a machine, within which a set of instructions for causing the machine to perform any one or more of the methodologies discussed herein can be executed. The computer system 1400 can be implemented in the contexts of the likes of computing systems, networks, servers, or combinations thereof. The computer system 1400 includes one or more processor units 1410 and main memory 1420. Main memory 1420 stores, in part, instructions and data for execution by processor 1410. Main memory 1420 stores the executable code when in operation. The computer system 1400 further includes a mass data storage 1430, portable storage medium drive(s) 1440, output devices 1450, user input devices 1460, a graphics display system 1470, and peripheral devices 1480. The methods may be implemented in software that is cloud-based.

The components shown in FIG. 14 are depicted as being connected via a single bus 1490. The components may be connected through one or more data transport means. Processor unit 1410 and main memory 1420 are connected via a local microprocessor bus, and mass data storage 1430, peripheral device(s) 1480, portable storage device 1440, and graphics display system 1470 are connected via one or more I/O buses.

Mass data storage 1430, which can be implemented with a magnetic disk drive, solid state drive, or an optical disk drive, is a non-volatile storage device for storing data and instructions for use by processor unit 1410. Mass data storage 1430 stores the system software for implementing embodiments of the present disclosure for purposes of loading that software into main memory 1420.

Portable storage device 1440 operates in conjunction with a portable non-volatile storage medium, such as a floppy disk, Compact Disc, Digital Versatile Disc (DVD), or USB storage device, to input and output data and code to and from the computer system 1400. The system software for implementing embodiments of the present disclosure is stored on such a portable medium and input to the computer system 1400 via the portable storage device 1440.

User input devices 1460 provide a portion of a user interface. User input devices 1460 include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 includes output devices 1450. Suitable output devices include speakers, printers, network interfaces, and monitors.

Graphics display system 1470 includes a liquid crystal display or other suitable display device. Graphics display system 1470 receives textual and graphical information and processes the information for output to the display device.

Peripheral devices 1480 may include any type of computer support device to add additional functionality to the computer system.

The components provided in the computer system 1400 of FIG. 14 are those typically found in computer systems that may be suitable for use with embodiments of the present disclosure and are intended to represent a broad category of such computer components that are well known in the art. Thus, the computer system 1400 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1400 may be implemented as a cloud-based computing environment, such as a virtual machine operating within a computing cloud. In other embodiments, the computer system 1400 may itself include a cloud-based computing environment, where the functionalities of the computer system 1400 are executed in a distributed fashion. Thus, the computer system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for establishing secure sessions have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for establishing secure sessions, the system comprising:
a security gateway configured to:
receive, from a client, a request to establish a secure communication between the client and a server, the request including a data packet having one or more client extension fields, wherein the data packet includes client security parameters in the one or more client extension fields;
forward the request to the server;
receive, from the server, a secure session response, the secure session response including a further data packet having one or more server extension fields, wherein the further data packet comprises server security parameters in the one or more server extension fields;
receive, from the server, a server key secret, the server key secret being encrypted by the server using a gateway key secret, the gateway key secret being associated with the security gateway and being retrieved by the server from a network controller;
forward the secure session response and the server key secret to the client, the server key secret being decrypted by the security gateway using the gateway key secret prior to the forwarding the server key secret to the client;
receive, from the client, a client key secret;
forward the client key secret to the server;
calculate a session key based on the client key secret and one of the client security parameters and the server security parameters; and
establish the secure communication between the client and the server by:
establishing a first secure session between the security gateway and the server, the first secure session being associated with the session key, the session key being used by the security gateway and the server for encrypting and decrypting data packets sent during the first secure session, wherein the server calculates the session key for the first secure session based on the client key secret and the client security parameters; and
establishing a second secure session between the security gateway and the client, the second secure session being associated with the session key, the session key being used by the security gateway and the client for encrypting and decrypting data packets sent during the second secure session, wherein the client calculates the session key for the second secure session based on the client key secret and the server security parameters; and
a storage unit in communication with the security gateway, the storage unit being configured to store at least the session key, the client security parameters, and the server security parameters.

2. The system of claim 1, further comprising the network controller, the network controller being configured to:
receive the server key secret from the server;
receive, from the security gateway, a request to provide the server key secret, the server key secret being pre-stored by the server at the network controller;
in response to the request to provide the server key secret, send the server key secret to the security gateway,
wherein the receiving of the server key secret from the server by the security gateway includes receiving the server key secret from the network controller.

3. The system of claim 1, wherein the receiving of the server key secret from the server includes receiving the server key secret in the one or more server extension fields of the secure session response from the server.

4. The system of claim 1, wherein each of the first secure session and the second secure session includes at least one of a secure sockets layer session and a transport layer security session.

5. The system of claim 1, wherein the client security parameters include at least one of a client-side random number, a client cipher list, and a client cipher identity; and
   wherein the server security parameters include at least one of a server-side random number, a server cipher list, and a server cipher identity.

6. The system of claim 1, wherein the request is a Client Hello message of a handshake procedure between the client and the server, and wherein the secure session response is a Server Hello message of the handshake procedure between the client and the server.

7. The system of claim 1, wherein the client key secret is encrypted by the client using the server key secret.

8. The system of claim 7, wherein the security gateway is further configured to decrypt the client key secret using the server key secret upon receiving the client key secret from the client.

9. A method for establishing secure sessions, the method comprising:
   receiving, by a security gateway, from a client, a request to establish a secure communication between the client and a server, the request including a data packet having one or more client extension fields, wherein the data packet includes client security parameters in the one or more client extension fields;
   forwarding, by the security gateway, the request to the server;
   receiving, by the security gateway, from the server, a secure session response, the secure session response including a further data packet having one or more server extension fields, wherein the further data packet comprises server security parameters in the one or more server extension fields;
   receiving, by the security gateway, from the server, a server key secret, the server key secret being encrypted by the server using a gateway key secret, the gateway key secret being associated with the security gateway and being retrieved by the server from a network controller;
   forwarding, by the security gateway, the secure session response and the server key secret to the client, the server key secret being decrypted by the security gateway using the gateway key secret prior to the forwarding the server key secret to the client;
   receiving, by the security gateway, from the client, a client key secret;
   forwarding, by the security gateway, the client key secret to the server;
   calculating, by the security gateway, a session key based on the client key secret and one of the client security parameters and the server security parameters; and
   establishing, by the security gateway, the secure communication between the client and the server by:
      establishing, by the security gateway, a first secure session between the security gateway and the server, the first secure session being associated with the session key, the session key being used by the security gateway and the server for encrypting and decrypting data packets sent during the first secure session, wherein the server calculates the session key for the first secure session based on the client key secret and the client security parameters; and
      establishing, by the security gateway, a second secure session between the security gateway and the client, the second secure session being associated with the session key, the session key being used by the security gateway and the client for encrypting and decrypting data packets sent during the second secure session, wherein the client calculates the session key for the second secure session based on the client key secret and the server security parameters.

10. The method of claim 9, wherein the session key is a symmetric security key, wherein the calculating of the session key for the first secure session includes calculating, by the security gateway, the session key based on the client key secret and the client security parameters, and wherein the calculating of the session key for the second secure session includes calculating, by the security gateway, the session key based on the client key secret and the server security parameters.

11. The method of claim 9, wherein the receiving, by the security gateway, the client key secret from the client includes receiving the client key secret in a client key exchange message sent by the client.

12. The method of claim 9, wherein the receiving, by the security gateway, the server key secret from the server includes receiving the server key secret in the one or more server extension fields of the secure session response from the server.

13. The method of claim 9, wherein the receiving, by the security gateway, the server key secret from the server includes retrieving the server key secret from the network controller, the server key secret being pre-stored by the server at the network controller.

14. The method of claim 9, wherein the server calculates the session key for the first secure session based on the client key secret and the client security parameters, and wherein the client calculates the session key for the second secure session based on the client key secret and the server security parameters.

15. The method of claim 9, further comprising:
   retrieving, by the security gateway, the client security parameters from the request; and
   retrieving, by the security gateway, the server security parameters from the secure session response.

16. The method of claim 9, further comprising:
   prior to receiving the request to establish the secure session from the client, receiving, by the security gateway, from the client, a request for a communication session between the client and the server;
   based on the request for the communication session, establishing, by the security gateway, a first communication session between the security gateway and the client and a second communication session between the security gateway and the server;
   wherein the request to establish the secure session between the client and the server is received by the security gateway over the first communication session.

17. The method of claim 16, wherein the first communication session is a first Transmission Control Protocol (TCP) session and the second communication session is a second TCP session.

18. The method of claim 9, further comprising:
   upon the receiving of the request to establish the secure session, creating, by the security gateway, a secure proxy session to relay data packets between the first secure session and the second secure session; and storing, by the security gateway, the session key to the secure proxy session.

19. The method of claim 18, further comprising:
receiving, by the security gateway, an encrypted data packet from the client over the second secure session;
matching, by the security gateway, the second secure session with the secure proxy session to retrieve the session key associated with the second secure session;
decrypting, by the security gateway, the encrypted data packet using the session key to obtain an unencrypted data packet;
applying, by the security gateway, a security policy to the unencrypted data packet;
upon the applying of the security policy, encrypting, by the security gateway, the unencrypted data packet into a further encrypted data packet using the session key;
sending, by the security gateway, the further encrypted data packet to the server.

20. A system for establishing secure sessions, the system comprising:
a security gateway configured to:
receive, from a client, a request for a communication session between the client and a server;
based on the request for the communication session, establish a first communication session between the security gateway and the client and a second communication session between the security gateway and the server;
receive, from the client, over the first communication session, a request to establish a secure communication between the client and the server, the request including a data packet having one or more client extension fields, wherein the data packet includes client security parameters in the one or more client extension fields;
forward the request to establish the secure communication to the server;
receive, from the server, a secure session response, the secure session response including a further data packet having one or more server extension fields, wherein the further data packet comprises server security parameters in the one or more server extension fields;
receive, from the server, a server key secret, the server key secret being encrypted by the server using a gateway key secret, the gateway key secret being associated with the security gateway and being retrieved by the server from a network controller;
forward the secure session response and the server key secret to the client, the server key secret being decrypted by the security gateway using the gateway key secret prior to the forwarding the server key secret to the client;
receive, from the client, a client key secret;
forward the client key secret to the server;
calculate a session key based on the client key secret and one of the client security parameters and the server security parameters; and
establish the secure communication between the client and the server by:
establishing a first secure session between the security gateway and the server, the first secure session being associated with the session key, the session key being used by the security gateway and the server for encrypting and decrypting data packets sent during the first secure session, wherein the server calculates the session key for the first secure session based on the client key secret and the client security parameters; and
establishing a second secure session between the security gateway and the client, the second secure session being associated with the session key, the session key being used by the security gateway and the client for encrypting and decrypting data packets sent during the second secure session, wherein the client calculates the session key for the second secure session based on the client key secret and the server security parameters;
the network controller, the network controller being configured to:
receive the server key secret from the server;
receive, from the security gateway, a request to provide the server key secret; and
in response to the request to provide the server key secret, send the server key secret to the security gateway, wherein the receiving of the server key secret by the security gateway from the server includes receiving the server key secret from the network controller; and
a storage unit in communication with the security gateway, the storage unit being configured to store at least the session key, the client security parameters, and the server security parameters.

* * * * *